US 11,573,337 B2

(12) United States Patent
Shimada et al.

(10) Patent No.: US 11,573,337 B2
(45) Date of Patent: Feb. 7, 2023

(54) RADIATION DETECTION DEVICE

(71) Applicant: DAI NIPPON PRINTING CO., LTD., Tokyo (JP)

(72) Inventors: Osamu Shimada, Tokyo (JP); Tomohisa Motomura, Tokyo (JP); Toru Tanimori, Kyoto (JP); Atsushi Takada, Kyoto (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/237,696

(22) Filed: Apr. 22, 2021

(65) Prior Publication Data

US 2021/0263172 A1    Aug. 26, 2021

Related U.S. Application Data

(63) Continuation of application No. PCT/JP2019/040712, filed on Oct. 16, 2019.

(30) Foreign Application Priority Data

Oct. 26, 2018   (JP) .............................. JP2018-201765

(51) Int. Cl.
   *G01T 1/24* (2006.01)
(52) U.S. Cl.
   CPC ............... *G01T 1/241* (2013.01); *G01T 1/242* (2013.01); *G01T 1/244* (2013.01)
(58) Field of Classification Search
   CPC .......... G01T 1/241; G01T 1/242; G01T 1/244
   See application file for complete search history.

(56) References Cited

U.S. PATENT DOCUMENTS 4,255,659 A     3/1981  Kaumnan et al.
6,121,622 A *   9/2000  Beyne ..................... H01J 47/02
                                                250/374

(Continued)

FOREIGN PATENT DOCUMENTS

EP      1492168 A1     12/2004
JP      2002-006047 A   1/2002

(Continued)

OTHER PUBLICATIONS

Jan. 14, 2020 International Search Report issued in International Patent Application No. PCT/JP2019/040712.

(Continued)

*Primary Examiner* — Hugh Maupin
(74) *Attorney, Agent, or Firm* — Oliff PLC

(57) ABSTRACT

A radiation detection device includes a detection element including a substrate having a first surface and a second surface, a first electrode on the first surface, a second electrode adjacent to the first electrode in a first direction, a third electrode adjacent to the first electrode in a second direction; a fourth electrode adjacent to the third electrode in the first direction and adjacent to the second electrode in the second direction and a fifth electrode on the first surface and between the first and second electrode, between the first and third electrode, between the second and fourth electrode, and between the third and fourth electrode; a wiring layer on the second surface and including a first wiring, a second wiring, a third wiring, and a fourth wiring; and a circuit element opposite to the wiring layer and connected to the first to fourth wiring.

20 Claims, 20 Drawing Sheets

(56) References Cited

U.S. PATENT DOCUMENTS

| | | |
|---|---|---|
| 6,333,504 B1 | 12/2001 | Lingren et al. |
| 2002/0134945 A1 | 9/2002 | Tanimori et al. |
| 2008/0061245 A1 | 3/2008 | Yamamoto |
| 2012/0227260 A1* | 9/2012 | Motomura .............. G01T 1/185 |
| | | 29/847 |

FOREIGN PATENT DOCUMENTS

| | | | |
|---|---|---|---|
| JP | 2008-064664 A | | 3/2008 |
| JP | 2012-168170 A | | 9/2012 |
| JP | 5515881 | B2 | 6/2014 |
| JP | 5790750 | B2 | 10/2015 |
| KR | 100969123 | B1 | 7/2010 |

OTHER PUBLICATIONS

Jan. 14, 2020 Written Opinion issued in International Patent Application No. PCT/JP2019/040712.

Jun. 2, 2020 Office Action issued in Japanese Patent Application No. 2018-201765.

Jan. 14, 2020 Translation of Written Opinion issued is International Patent Application No. PCT/JP2019/040712.

Jun. 27, 2022 Extended Search Report issued in European Patent Application No. 19875060.6.

* cited by examiner

RADIATION DETECTION DEVICE

CROSS REFERENCE TO RELATED APPLICATIONS

This application is based upon and claims the benefit of priority from the prior Japanese Patent Application No. 2018-201765, filed on Oct. 26, 2018, and PCT Application No. PCT/JP2019/040712 filed on Oct. 16, 2019, the entire contents of which are incorporated herein by reference.

FIELD

The present disclosure relates to a radiation detection device.

BACKGROUND

Research on a gas-electron amplification-type radiation detection device by a pixel-type electrode is proceeding. Such a radiation detection device detects radiation by using a pixel-type electrode. In this case, it is possible to detect tracks of charged particles (for example, see Japanese Unexamined Patent Application Publication No. 2002-6047).

SUMMARY

According to an embodiment of the present disclosure, there is provided a radiation detection device including a detection element including a substrate having a first surface and a second surface on the opposite side with respect to the first surface, a first electrode arranged on the first surface, a second electrode adjacent to the first electrode in a first direction, a third electrode adjacent to the first electrode in a second direction intersecting the first direction; a fourth electrode adjacent to the third electrode in the first direction and adjacent to the second electrode in the second direction and a fifth electrode arranged on the first surface of the substrate and arranged between the first electrode and the second electrode, between the first electrode and the third electrode, between the second electrode and the fourth electrode, and between the third electrode and the fourth electrode; a wiring layer arranged on the second surface side and including a first wiring connected to the first electrode, a second wiring connected to the second electrode, a third wiring connected to the third electrode, and a fourth wiring connected to the fourth electrode; and a circuit element arranged opposite to the wiring layer and connected to the first wiring, the second wiring, the third wiring, and the fourth wiring.

According to the above radiation detection device, the first electrode, the second electrode, the third electrode, and the fourth electrode may have a portion penetrating from the first surface to the second surface.

According to the above radiation detection device, the fifth electrode may surround the first electrode, the second electrode, the third electrode and the fourth electrode, and the fifth electrode may include a first opening around the first electrode, a second opening around the second electrode, a third opening around the third electrode, and a fourth opening around the fourth electrode.

According to the above radiation detection device, the first opening, the second opening, the third opening and the fourth opening may have a circular shape.

According to the above radiation detection device, a second detection element arranged apart from the detection element may be included.

According to the above radiation detection device, the detection element and the second detection element may be electrically connected by a mounted electrode.

According to the radiation detection device, the fifth electrode may have a portion penetrating from the first surface to the second surface.

The above radiation detection device may include an external connection terminal arranged on the wiring layer and having a portion connected to the wiring.

According to the above radiation detection device, the thickness of the external connection terminal may be greater than the thickness of the circuit element.

According to the above radiation detection device, the fifth electrode may have a portion penetrating from the first surface to the second surface and connected to the external connection terminal via a fifth wiring provided in the wiring layer.

The above radiation detection device may further include a wiring board arranged opposite to the circuit element; and an external connection terminal arranged between the circuit element and the wiring board.

According to an embodiment of the present disclosure, there is provided a radiation detection device including: a detection element including two or more electrodes detecting an electric charge generated by an interaction between radiation and a material, the two or more electrodes being arranged separately on the same plane in a first direction and in a second direction intersecting the first direction; a wiring layer having wiring individually connected to each of the two or more electrodes, and a connection pad arranged in the same plane on the wiring layer and individually connected to the wiring; and a circuit element arranged opposite to the connection pad and connected to the connection pad.

According to the above radiation detection device, the material may be a gas.

According to the above radiation detection device, an external connection terminal may be arranged outside of the circuit element.

The above radiation detection device may further include a second external connection terminal arranged on the circuit element and having a portion connected to the wiring layer.

According to the above radiation detection device, the circuit element may include an input section having an input terminal, a pre-amplifier, and an AC coupling circuit arranged between the input terminal and the pre-amplifier.

The above radiation detection device may further include a protection circuit between the circuit element and the first wiring layer, the second wiring layer, the third wiring layer, and the fourth wiring layer.

According to the above radiation detection device, the protection circuit may be a fuse element.

According to an embodiment of the present disclosure, it is possible to provide a radiation detection device with high position detection accuracy.

DESCRIPTION OF EMBODIMENT

Figure 1:
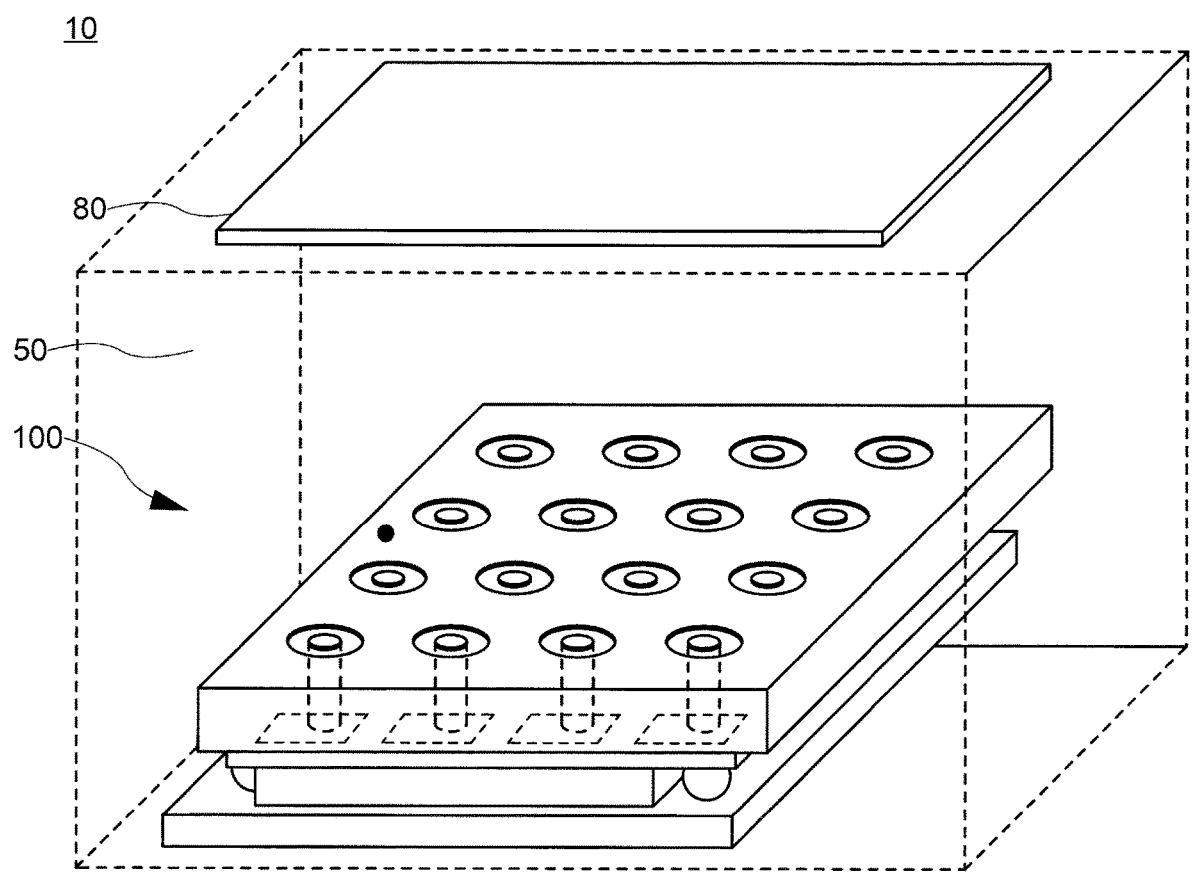
FIG. 1 is a perspective view of a radiation detection device according to the first embodiment of the present disclosure.

According to the radiation detection devices disclosed in Japanese Unexamined Patent Application Publication No. 2002-6047, Japanese Patent Publication No. 5790750, and Japanese Patent Publication No. 5515881, an electron is generated by interaction of radiation (a charged particle) with a gas, and the electron is captured by a pixel-type electrode, thereby indirectly detecting the radiation. In this case, an anode electrode and cathode electrode used for the pixel-type electrode are connected in a direction perpendicular to each other, and a signal is detected as a matrix in a X-direction and Y-direction, and the signal is taken out from an end portion of a detection device. However, when using this detection method, it may be difficult to separate those signals when detection signals occur at a distance at the same time.

In the case of a conventional detection method, a detection element was connected to a peripheral circuit via a wiring board or the like provided in an end portion of the element, and detection accuracy was sometimes reduced because noise was easily generated due to weak signals.

Further, in order to protect a weak signal as in Patent Literature 2, a shielding member (not shown) was required.

The present disclosure provides a radiation detection device with high position detection accuracy.

Hereinafter, a radiation detection device according to an embodiment of the present disclosure will be described in detail with reference to the drawings. The following embodiments are examples of embodiments of the present disclosure, and the present disclosure is not to be construed as being limited to these embodiments. In the drawings referred to in the present exemplary embodiments, the same portions or portions having similar functions are denoted by identical signs or similar signs (signs each formed simply by adding A, B, etc. to the end of a number), and a repetitive description thereof may be omitted. For convenience of description, the dimensional ratio of the drawings (the ratio between the components, the ratio in the vertical and horizontal directions, etc.) may be different from the actual ratio, or a part of the configuration may be omitted from the drawings.

First Embodiment (1-1. Configuration of Radiation Detection Device 10)

A summary of a configuration of a radiation detection device 10 including a radiation detection device 100 according to an embodiment of the present disclosure is described with reference to FIG. 1. The radiation detection device 10 according to the present embodiment includes a drift electrode 80, the radiation detection device 100, and a chamber 50. The drift electrode 80 and the radiation detection device 100 are arranged in the chamber 50 to face each other via a certain space. The chamber 50 is filled with a mixed gas of a rare gas such as argon or xenon and a gas (a quenching gas) having a quenching action containing an alkane or carbon dioxide gas at a room temperature such as ethane or methane. These gases may be enclosed alone in the chamber 50, or a mixed gas of two or more kinds of mixed gases may be enclosed.

(1-2. Configuration of Radiation Detection Device 100)

A configuration of the radiation detection device 100 will be described. In the following description, an example of a detection element 110 is shown with a pixel (an anode electrode), which is a unit for capturing an electron, arranged in a 4×4 shape. This arrangement is an example to simplify the explanation. In practice, many pixels are often arranged in a 256×256 configuration for example.

Figure 2:
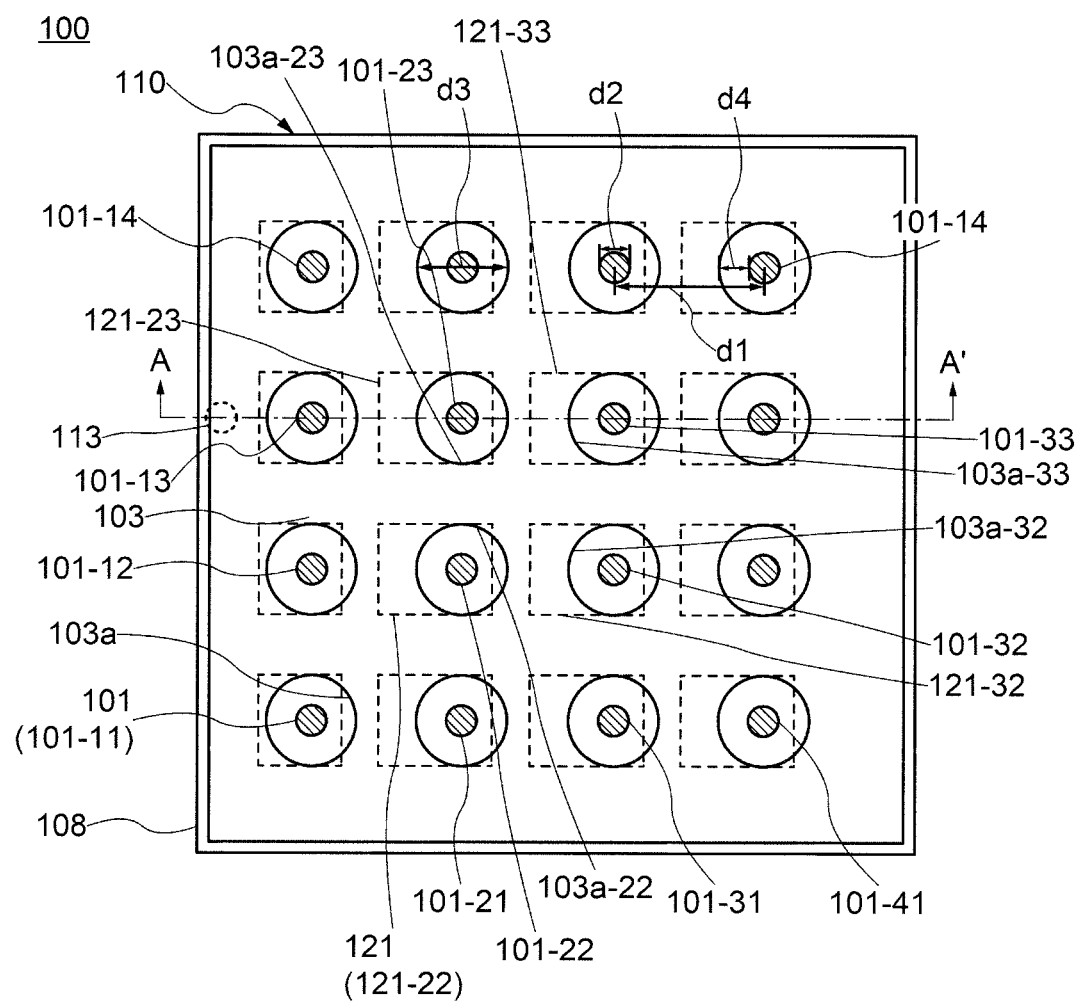
FIG. 2 is a top view illustrating an electrode portion of a detection element of the radiation detection device according to the first embodiment of the present disclosure.
Figure 3:
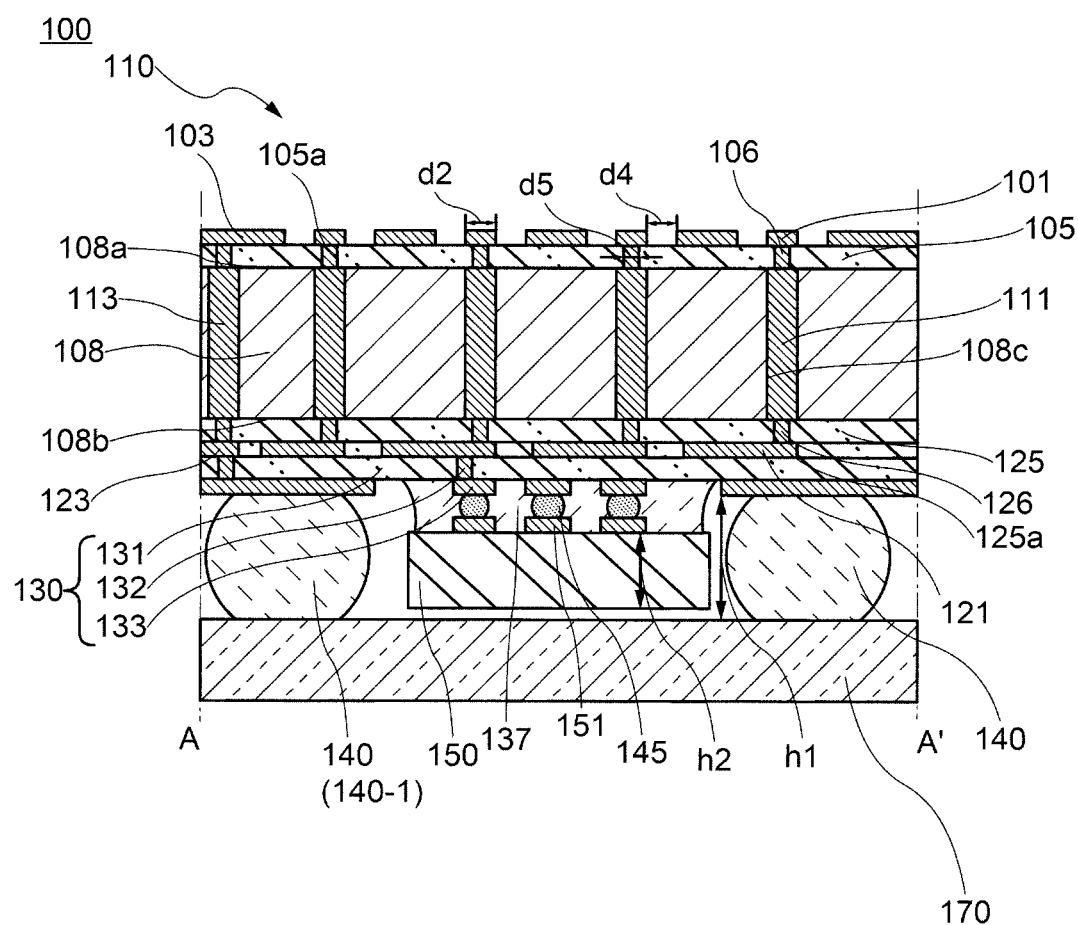
FIG. 3 is a cross-sectional view (a cross-sectional structure of a cross-sectional line A-A' in FIG. 2) illustrating the radiation detection device according to the first embodiment of the present disclosure.
Figure 4:
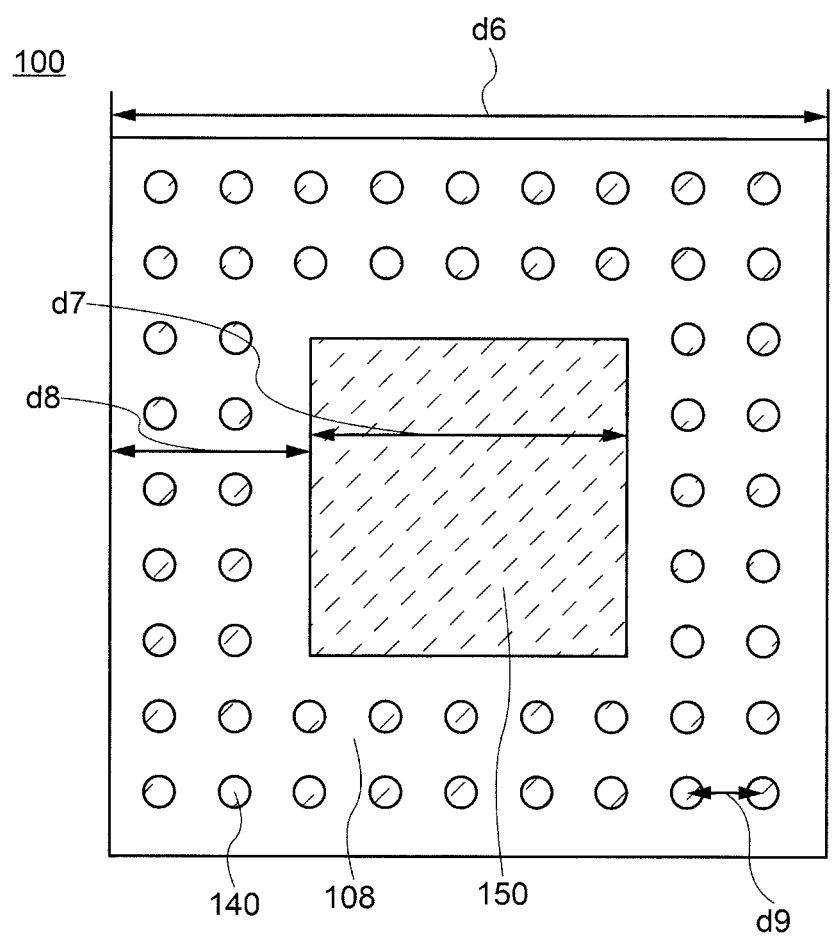
FIG. 4 is a bottom view of the radiation detection device 100 according to the first embodiment of the present disclosure.

FIG. 2 is a top view illustrating an electrode portion of the detection element 110 of the radiation detection device 100 according to the first embodiment of the present disclosure. FIG. 3 is a schematic view showing a cross-sectional structure of the radiation detection device 100 according to the first embodiment of the present disclosure (a cross-sectional structure of the cross-sectional line A-A' in FIG. 2). FIG. 4 is a bottom view of the radiation detection device 100 according to the first embodiment of the present disclosure.

The radiation detection device 100 includes the detection element 110, a wiring layer 130, an external connection terminal 140, a circuit element 150, and a wiring board 170. Each configuration will be described in detail below.

As shown in FIGS. 2 and 3, in the detection element 110, an anode electrode 101 and a cathode electrode 103 are arranged on a first surface 108a of an insulating substrate 108. In the present embodiment, the anode electrode 101 is arranged in a matrix along the X-direction (a first direction) and the Y-direction (a second direction). In this example, a distance between the anode electrodes 101 adjacent in the X-direction is equal to a distance between the anode electrodes 101 adjacent in the Y-direction. The X-direction and the Y-direction intersect at 90 degrees.

The anode electrode 101 corresponds to a pixel, which is a unit for capturing an electron. As described above, in the present embodiment, the anode electrode 101 is arranged corresponding to four pixels in the X-direction and four pixels in the Y-direction, for 16 pixels in total. In the following explanation, a region in which 16 pixels are arranged is sometimes referred to as a detection region.

In FIG. 2, each of a plurality of anode electrodes 101 is referred to as an anode electrode 101-xy depending on where each of the plurality of anode electrodes 101 is arranged in the radiation detection device 100. Here, "x" indicates a coordinate in the X-direction (1 to 4) with reference to an anode electrode 101-11 (a lower left pixel in FIG. 2). On the other hand, "y" indicates a coordinate in the Y-direction (1 to 4) with reference to the anode electrode 101-11. That is, an anode electrode 101-41 corresponds to the anode electrode 101 in the lower right area, an anode electrode 101-14 corresponds to the anode electrode 101 in the upper left area, and an anode electrode 101-44 corresponds to the anode electrode 101 in the upper right area. In this case, an anode electrode 101-32 (also referred to as a second electrode) is adjacent to an anode electrode 101-22 (also referred to as a first electrode) in the X-direction. An anode electrode 101-23 (also referred to as a third electrode) is adjacent to the anode electrode 101-22 in the Y-direction. An anode electrode 101-33 (also referred to as a fourth electrode) is adjacent to the anode electrode 101-22 in a direction between the X-direction and Y direction. In addition, the anode electrode 101-33 is adjacent to the anode electrode 101-23 in the X-direction and to the anode electrode 101-32 in the Y-direction.

A position of a pixel is sometimes referred to as a pixel (xy). For example, a pixel (11) corresponds to the anode electrode 101-11.

In the above description, the cathode electrode 103 (also referred to as a fifth electrode) is provided in a planar shape and has a plurality of circular openings 103a arranged in a lattice shape. Each of the anode electrodes 101 is surrounded by the corresponding opening 103a. Specifically, the anode electrode 101-22 is surrounded by an opening 103a-22 (also referred to as a first opening). The anode electrode 101-32 is surrounded by an opening 103a-32 (also referred to as a second opening). The anode electrode 101-23 is surrounded by an opening 103a-23 (also referred to as a third opening). The anode electrode 101-33 is surrounded by an opening 103a-33 (also referred to as a fourth opening). In this case, the cathode electrode 103 may be said to be provided between the anode electrode 101-22 and the anode electrode 101-32, between the anode electrode 101-22 and the anode electrode 101-23, between the anode electrode 101-33, between the anode electrode 101-32 and the anode electrode 101-33, and between the anode electrode 101-22 and the anode electrode 101-33.

An outer shape of the cathode electrode 103 is smaller than an outer shape of an insulating substrate. As a result, it is possible to prevent the cathode electrode 103 from being peeled off when the detection element 110 is manufactured.

For example, a conductive material formed of copper is used for the anode electrode 101 and the cathode electrode 103.

The insulating substrate 108 (also referred to as a base material) is formed of a high resistance material. In this example, a glass substrate is used for the insulating substrate 108. A thickness of the insulating substrate 108 is not particularly limited and may have any desired thickness. In this example, the thickness of the insulating substrate 108 may be 300 μm.

The plurality of the anode electrodes 101 is connected to an anode wiring 121 provided on a second surface 108b of the insulating substrate via a through electrode 111 that is provided on a through hole 108c of the insulating substrate 108 and penetrates from the first surface 108a to the second surface 108b. Although a line width of the anode wiring 121 is not limited, it is preferably thin. Specifically, it is preferably 20 μm or less. Since the line width of the anode wiring 121 is narrow, a capacitance between the anode wiring 121 and the cathode electrode 103 can be suppressed to a small amount, and electric field concentration between the anode electrode 101 and the cathode electrode 103 can be increased. As a result, an amplification rate in an electron avalanche to be described later can be increased. In this example, the anode electrode 101 and the through electrode 111 together are defined as a single anode electrode. In this case, the through electrode 111 may be a portion penetrating from the first surface 108a to the second surface 108b, and the anode electrode 101 may be a portion exposed in the opening 103a. In this example, in the detection element 110, the anode electrode 101-22, the anode electrode 101-32, the anode electrode 101-23, and the anode electrode 101-33 have a penetrating portion respectively.

A via electrode 106 may be arranged between the anode electrode 101 and the through electrode 111. The via electrode 106 is provided in a via 105a of an insulating layer 105. A diameter d5 of a top surface portion 106a of the via electrode 106 is preferably smaller than a diameter d2 of the anode electrode 101. As a result, while the detection element 110 is manufactured, even when the top surface of the via electrode 106 is etched, an etchant is prevented from penetrating the through hole 108c provided in the insulating substrate 108. Similarly, a via electrode 126 is provided between the anode wiring 121 and the through electrode 111. The via electrode 126 is arranged in a via 125a provided in an insulating layer 125. In the present embodiment, the insulating substrate 108 and the insulating layer 105 are combined to form a base material.

The insulating layer 105 and the insulating layer 125 are made of an insulating material. In this example, a polyimide resin is used for the insulating layer 105. The insulating layer 105 may be formed of an inorganic insulating material such as a silicone oxide film in addition to an organic insulating material other than the polyimide resin.

An anode wiring 121 is arranged for each anode electrode 101. For example, the anode electrode 101-22 among the anode electrodes 101 is correspondingly arranged with an anode wiring 121-22 among the anode wiring 121. Similarly, the anode electrode 101-32, the anode electrode 101-23, and the anode electrode 101-33 are respectively arranged corresponding with an anode wiring 121-32, an anode wiring 121-23, and an anode wiring 121-33. The anode wiring 121 is connected to a connection pad 133 provided in the wiring layer 130. In this case, the anode wiring 121 may have a portion to be routed in a wiring shape together with a portion used as a terminal. The one-to-one correspondence of the anode wiring 121 with the anode electrode 101 makes it possible to accurately grasp a detected position even if electric charges are captured at two anode electrodes at the same time at other coordinates as described later.

The cathode electrode 103 is connected to a cathode wiring 123 provided on the second surface 108b of the insulating substrate 108 via a through electrode 113 (also referred to as a portion penetrating from the first surface 108a to the second surface 108b) provided on the through hole 108c of the insulating substrate 108 for applying voltages. In this case, the cathode electrode 103 and the through electrode 113 together are defined as a cathode electrode. The cathode electrode 103 may have a portion penetrating from the first surface 108a to the second surface 108b.

The wiring layer 130 includes an insulating layer 131, a via electrode 132, and the connection pad 133 in addition to the anode wiring 121, the cathode wiring 123, the insulating layer 125, and the via electrode 126 described above. The connection pad 133 is connected to the anode wiring 121 via the via electrode 132 provided in a via provided in the insulating layer 131. In this case, a plurality of connection pads 133 is provided corresponding to the anode wirings 121. Specifically, the anode wiring 121-22 is connected to a first wiring, which is one of the connection pads 133. The anode wiring 121-32 is connected to a second wiring, which is one of the connection pads 133. The anode wiring 121-23 is connected to a third wiring, which is one of the connection pads 133. The anode wiring 121-33 is connected to a fourth wiring, which is one of the connection pads 133.

The insulating layer 131 is formed of the same material as the insulating layer 105. In the present embodiment, a polyimide resin is used for the insulating layer 131. The connection pad 133 is formed of the same material as the anode electrode 101 and the anode wiring 121. The via electrode 132 is formed of the same material as the via electrode 106. In the present embodiment, copper is used for the via electrode 132 and the connection pad 133.

As shown in FIGS. 3 and 4, the circuit element 150 is arranged on the wiring layer 130 on the second surface 108b side of the insulating substrate 108. In this case, the circuit element 150 is arranged at the center position of the detection element 110, and the external connection terminal 140 is arranged on the outside of the circuit element 150. For purposes of illustration, in FIG. 3, one external connection terminal 140 is arranged on both sides of the circuit element 150.

In this case, for the purpose of supplying voltages, the cathode wiring 123 is connected to one of the external connection terminals 140 (in this example, an external connection terminal 140-1) via a portion of the connection pad 133 (also referred to as the fifth wiring). In the present embodiment, a high voltage can be supplied to the detection element 110 without passing through the circuit element 150. As a result, noise can be prevented from being generated because a signal system and a high-voltage power supply system can be separated from each other.

An input terminal 151 of the circuit element 150 is connected via the connection pad 133 and a bump electrode 145 (also referred to as a second external connection terminal). In this case, it can be said that each of the connection pads 133 (the first wiring, the second wiring, the third wiring, and the fourth wiring) is connected independently to the circuit element 150.

The bump electrode 145 may be formed of a copper (Cu) pillar. In the case of the Cu pillar, a UBM (Under Bump Metal) is provided between the connection pad 133 and the Cu pillar, and a solder is further arranged on the top of the Cu pillar. In implementing the circuit element 150, an encapsulation material 137 is provided to protect the input terminal 151. In this example, an underfill material is used as the encapsulation material 137. At the time of connecting and implementing, the encapsulation material 137 may be formed of an encapsulating material such as an anisotropic conductive film (ACF), an anisotropic conductive paste (ACP), a non-conductive paste (NCP), and a non-conductive film (NCF) or the like and may be used together with the bump electrode 145.

The external connection terminal 140 is arranged on the wiring layer 130. The external connection terminal 140 is connected to the wiring board 170. A solder ball is used for the external connection terminal 140. When the solder ball is used, a UBM made of a lamination of nickel (Ni) and gold (Au) may be provided between the connection pad 133 of the wiring layer 130 and the external connection terminal 140. The external connection terminal 140 is not limited to the solder ball, and a lead wiring may be used the external connection terminal 140. A distance h1 from the top surface of the connection pad 133 to the top portion of the solder ball (also referred to as a thickness of the external connection terminal 140) is greater than a thickness h2 of the circuit element 150.

In FIG. 3, the circuit element 150 and the wiring board 170 are connected via the wiring layer 130 and the external connection terminal 140. Although not shown in the drawings, gaps between the wiring layer 130, the external connection terminal 140, and the wiring board 170 may be encapsulated by filling an underfill resin.

A printed wiring board is used for the wiring board 170 in this example. A copper wiring may be used as a wiring material of the wiring board 170. A signal processing circuit and a control circuit are mounted on the wiring board 170.

Dimensions of each component of the radiation detection device 100 will be exemplified as follows.

Distance d1 between centers of adjacent anode electrodes 101: 0.4 mm

Diameter d2 of the anode electrode 101: 60 μm

Diameter d3 of the opening 103a: 250 μm

Distance d4 between the anode electrode 101 and the cathode electrode 103: 75 μm Diameter d5 of the top surface portion of the via electrode 106: 50 μm Length d6 of one side of the detection element 110: 9.6 mm Length d7 of one side of the circuit element 150: 5 mm Distance d8 from an end portion of the circuit element 150 to an end portion of the detection element 110: 2.3 mm Distance d1 between centers of adjacent input terminals 151 of the circuit element 150: 0.2 mm Distance d9 (1-pixel length) between centers of adjacent external connection terminals 140: 0.5 mm Thickness h1 of the external connection terminal 140: 0.3 mm Thickness h2 of an integrated circuit: 0.2 mm (1-3. Detection Principle of Radiation)

Hereinafter, a detection principle of radiation in the radiation detection device 10 will be described with reference to FIGS. 5 and 6. A negative voltage with respect to a ground voltage (GND) is applied to the drift electrode 80. A ground voltage (GND) is applied to the anode electrode 101. A negative voltage with respect to the ground voltage (GND) is applied to the cathode electrode 103. In this example, −400V is applied to the cathode electrode 103. The voltages applied to the anode electrode 101 and the cathode electrode 103 may be varied respectively.

Figure 5:
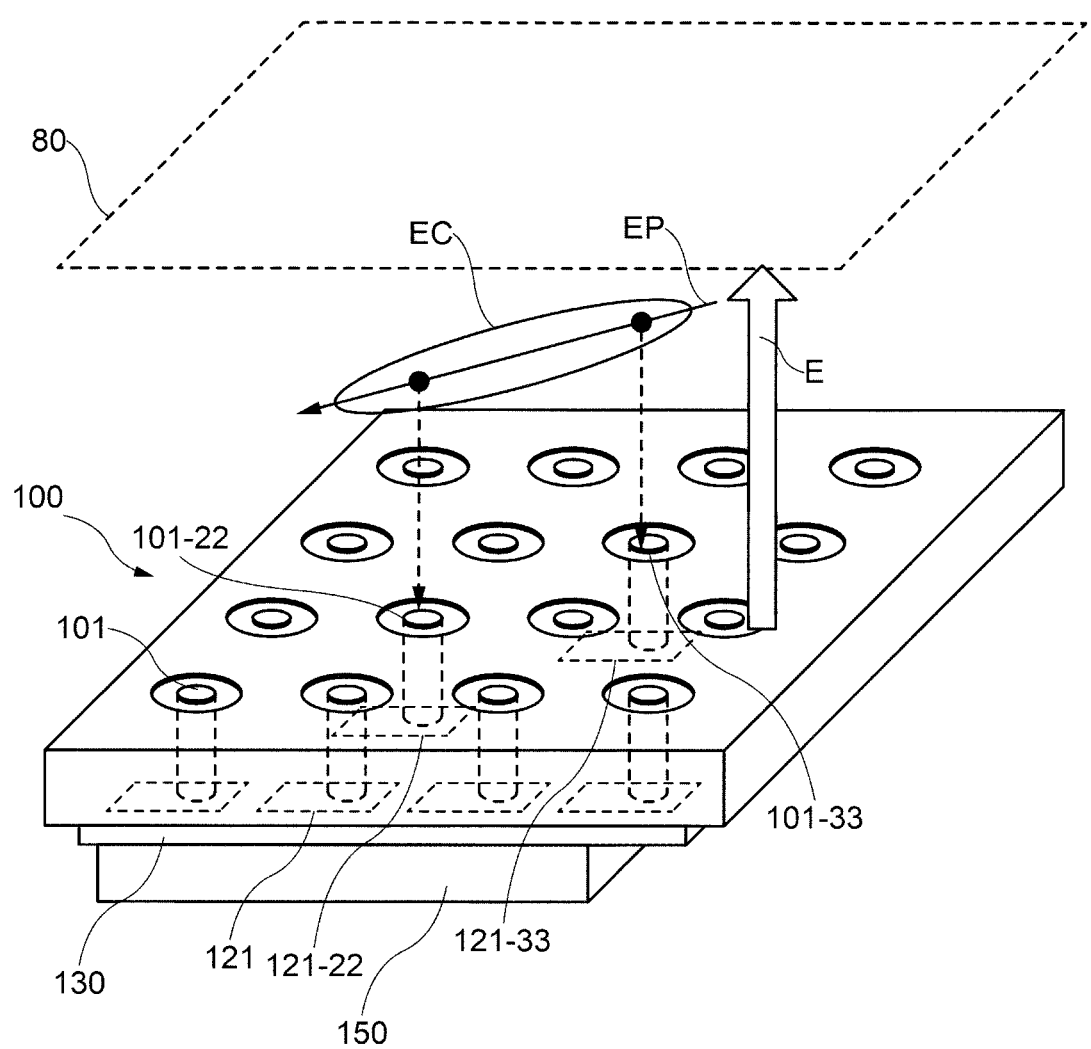
FIG. 5 is a diagram illustrating a detection principle of radiation using the radiation detection device according to the first embodiment of the present disclosure.

FIG. 5 is a diagram illustrating the detection principle of radiation using the detection element 110 according to the first embodiment of the present disclosure. When radiation (charged particles EP) enters the chamber 50, an electron cloud EC is formed by interaction with a gas existing in the chamber 50. Each electron of the electron cloud is attracted to the detection element 110 side along the Z-direction by an electric field E generated between the drift electrode 80 and the anode electrode 101. The electron attracted to the detection element 110 side is accelerated by a high electric field formed by the cathode electrode 103 and the anode electrode 101 and is attracted to the anode electrode 101. At this time, the electron collides with the gas and ionizes the gas. The electrons generated by ionization proliferate in an avalanche and are captured by the anode electrode 101. The captured electrons cause the anode electrode 101 to be negatively charged and the cathode electrode 103 to be positively charged. Due to the influence of these proliferated electrons, a pulse signal (voltage fluctuation) generated from these electric charges becomes large enough to be read out as an electric signal.

Tracks of the charged particle EP can be calculated by using the time when the voltage fluctuation of these detection signals occurred, and the position of a terminal (the anode electrode) that outputs the electric signal in which the voltage fluctuation occurred.

Figure 6:
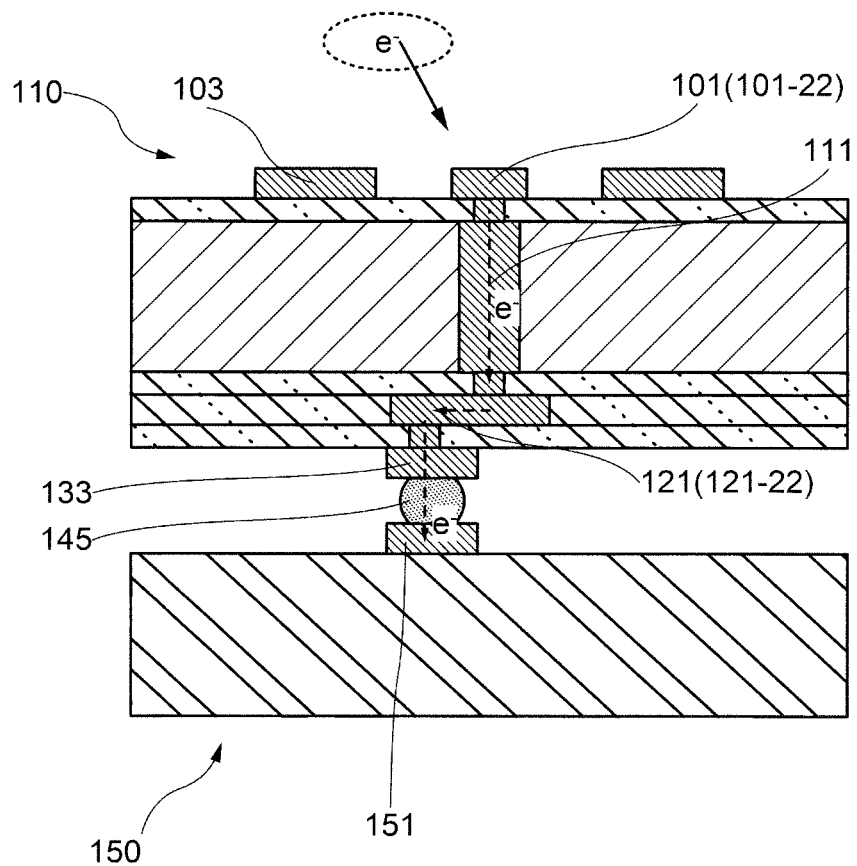
FIG. 6 is a diagram illustrating an electric charge generated at each electrode when an anode electrode captures an electron in a radiation detection device according to the first embodiment.

In FIGS. 5 and 6, the electrons are captured in the anode electrode 101-22 and the anode electrode 101-33. In this case, the electrons captured by the anode electrode 101-22 flow from the anode electrode 101-22 to the anode wiring 121-22, and are further transmitted to the circuit element 150 via the connection pad 133, the bump electrode 145, and the input terminal 151. Similarly, the electrons captured in the anode electrode 101-33 flow from the anode electrode 101-33 to the anode wiring 121-33, and are further transmitted to the circuit element 150 via the connection pad 133, the bump electrode 145, and the input terminal 151.

Figure 20:
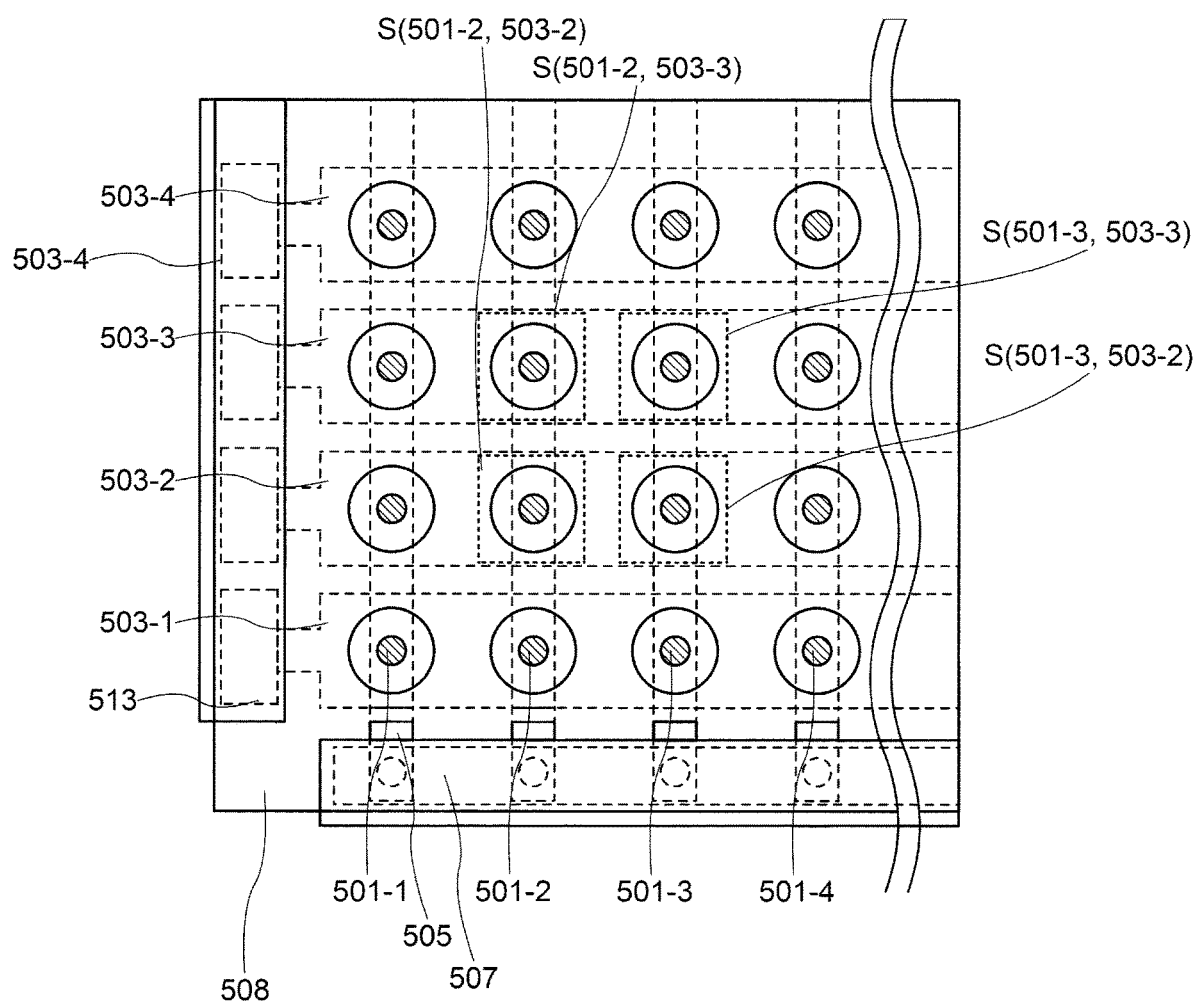
FIG. 20 is a top view illustrating a conventional radiation detection device.

A conventional detection method will be described here. FIG. 20 is a top view of a conventional radiation detection device. In the conventional detection method, the electric signal was transmitted from an anode electrode 501 to a terminal electrode 505 arranged at an end portion of an insulating substrate 508, and the electric signal was read out by using an integrated circuit externally provided via a connecting wiring 507. In the conventional detection method, since the terminal electrode 505 of the anode electrode 501 and a terminal electrode 513 of a cathode electrode 503 are respectively arranged in a direction perpendicular to each other, the detection signal is detected as a matrix in the X-direction and Y-direction.

The above method will be described in more detail. When the anode electrode 501 (anode electrodes 501-1 to 501-4) and the cathode electrode 503 (cathode electrodes 503-1 to 503-4) are arranged in the conventional detection method, it is assumed that the second anode electrode in number order from the left is the anode electrode 501-2, the third anode electrode from the left is the anode electrode 501-3, the second cathode electrode from the bottom in number order is the cathode electrode 503-2, and the third cathode electrode is the cathode electrode 503-3. Each of the four electrodes of the anode electrode 501-2 are respectively connected to each other on the opposite side of the insulating substrate 508. The same applies to the anode electrode 501-3. There are four positions S, at which the anode electrode 501-2, the anode electrode 501-3, the cathode electrode 503-2, and the cathode electrode 503-3 intersect each other, S(501-2, 503-2), S(501-2, 503-3), S(501-3, 503-2), and S(501-3, 503-3). When ionized electrons are generated due to the interaction of the radiation with the gas, a signal is detected at the same time in the anode electrodes 501-2 and 501-3, and a signal is detected at the same time in the cathode electrode 503-2 and the cathode electrode 503-3. At this time, when it is determined that these signals match, it cannot be determined whether S(501-2, 503-2) and the S(501-3, 503-3) are detected at the same time or S(501-2, 503-3) and the S(501-3, 503-2) are detected at the same time. As a result, it is difficult to separate the signals when the detection signal is generated at different locations at the same time.

Even in the conventional detection method, it is possible to sort the detection position by utilizing the difference and the signal amount of the signal transmission speed at each electrode pattern. However, in practice, the shorter the distance between the electrode patterns to be detected, the more difficult it is to sort the detection position. Furthermore, as the number of electrodes for which signals are detected increases, it becomes even more difficult to sort the detection position.

On the other hand, in the present embodiment, as shown in FIG. 2, the anode wiring 121 is respectively provided separately with respect to both the X-direction and Y-direction. The electric signal (electric charges) flows from the anode electrode 101 to the anode wiring 121, and is further transmitted to the circuit element 150 via the connection pad 133, the bump electrode 145, and the input terminal 151. In this case, the anode wiring 121 is in charge of the electrode corresponding to the conventional terminal electrode. As described above, since the electrode is arranged as a unique electrode to each of the anode wiring 121, and the input terminal 151 of the circuit element 150 is also provided separately, it is possible to separate the detection signal easily with high accuracy even if it is generated at different locations at the same time.

Thus, even when electrons are captured simultaneously in the two anode electrodes 101, the radiation detection device 100 in the present embodiment can easily identify the detection position. Therefore, erroneous detection can be reduced. As a result, the position detection accuracy of the radiation can be improved.

In this example, although the detection element 110 had 4×4 pixels (the anode electrode 101), with reference to one anode electrode 101, by having at least two anode electrodes 101 aligned in the X direction, and two anode electrodes 101 aligned in the Y direction, the configuration can be generalized. The two anode electrodes 101 aligned in the X-direction or Y direction may be defined as the adjacent anode electrodes 101 or as the non-adjacent anode electrodes 101. If it is generalized by the two non-adjacent anode electrodes 101, there will be another anode electrode 101 between them.

When the anode electrodes 101 are adjacent to each other, the four (2×2) anode electrodes 101 correspond to, for example, the anode electrodes 101-22, 101-23, 101-32, 101-33 (pixels (22), (23), (32), and (33)). When the anode electrodes 101 are not adjacent to each other, the four (2×2) anode electrodes 101 correspond to, for example, the anode electrodes 101-11, 101-14, 101-41, 101-44 (pixels (11), (14), (41), and (44)).

(1-4. Flow of Detection Signal)

Figure 7:
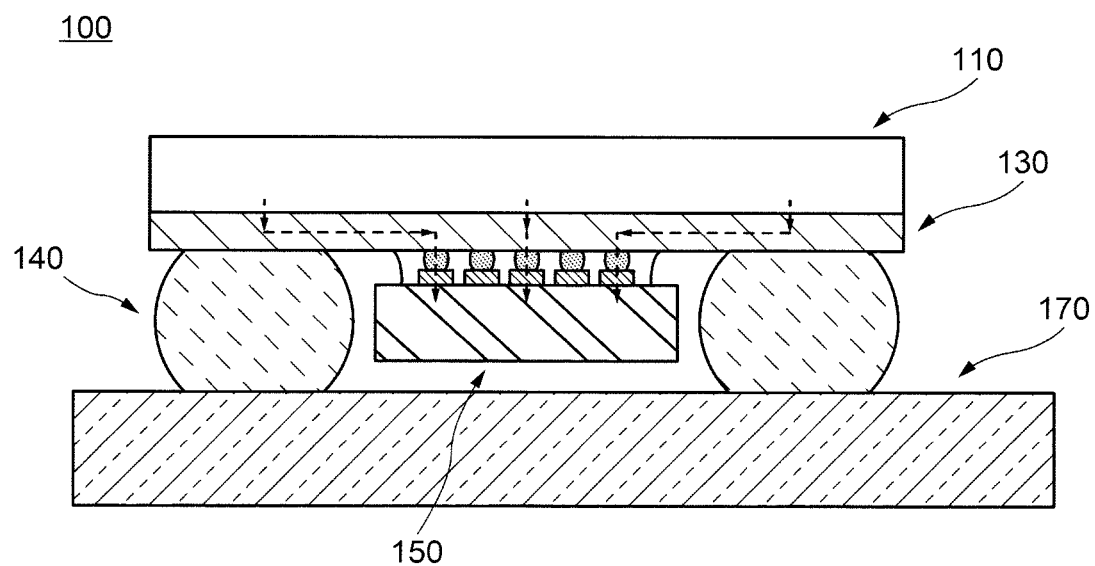
FIG. 7 is a diagram illustrating a flow of a detection signal in the radiation detection device according to the first embodiment of the present disclosure.
Figure 8:
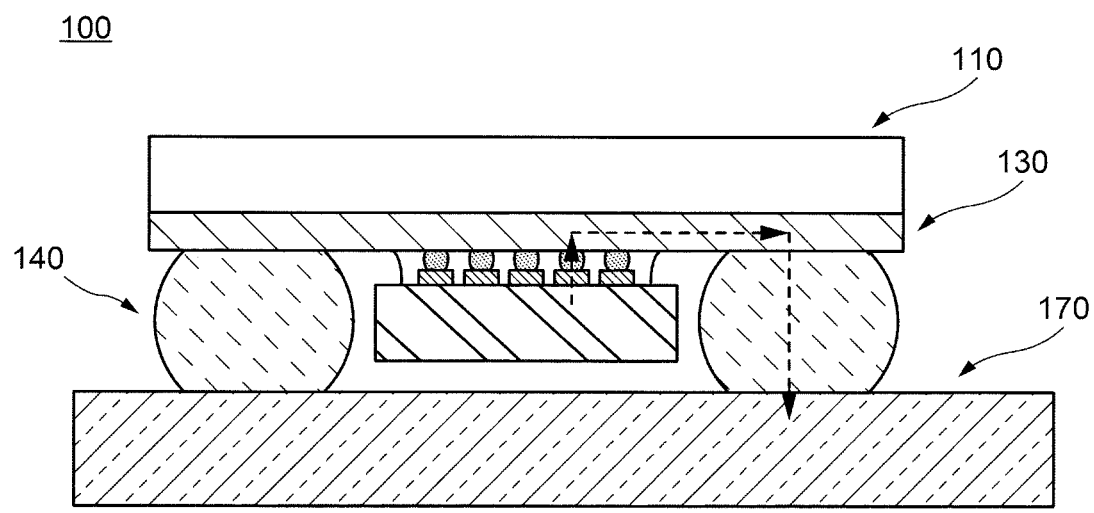
FIG. 8 is a diagram illustrating a flow of a detection signal in the radiation detection device according to the first embodiment of the present disclosure.

FIGS. 7 and 8 are schematic views showing a flow of the detection signal in the radiation detection device 100.

In the radiation detection device 100, as shown in FIG. 7, the signal detected by the detection element 110 is transmitted to the circuit element 150 via the wiring layer 130. The detection signal transmitted to the circuit element 150 is arithmetically processed in an internal circuit in the circuit element 150. Subsequently, as shown in FIG. 8, the arithmetically processed information is transmitted to the wiring board 170 via the wiring layer 130 and the external connection terminal 140.

In the present embodiment, the transmission of information such as the detection signal is performed without using additional wirings between the detection element 110 and the circuit element 150 (e.g., a flexible printed substrate provided in an end portion of the detection element, etc.) in the radiation detection device 100. This eliminates matching processing when obtaining the detection position information. Therefore, the processing speed of the detection signal can be improved. In addition, by using the present embodiment, a detection region of the detection element 110 can be widened because there is no need to provide wirings, circuits, or the like in the end portion.

(1-5. Circuit Configuration of Circuit Element of Radiation Detection Device)

Figure 9:
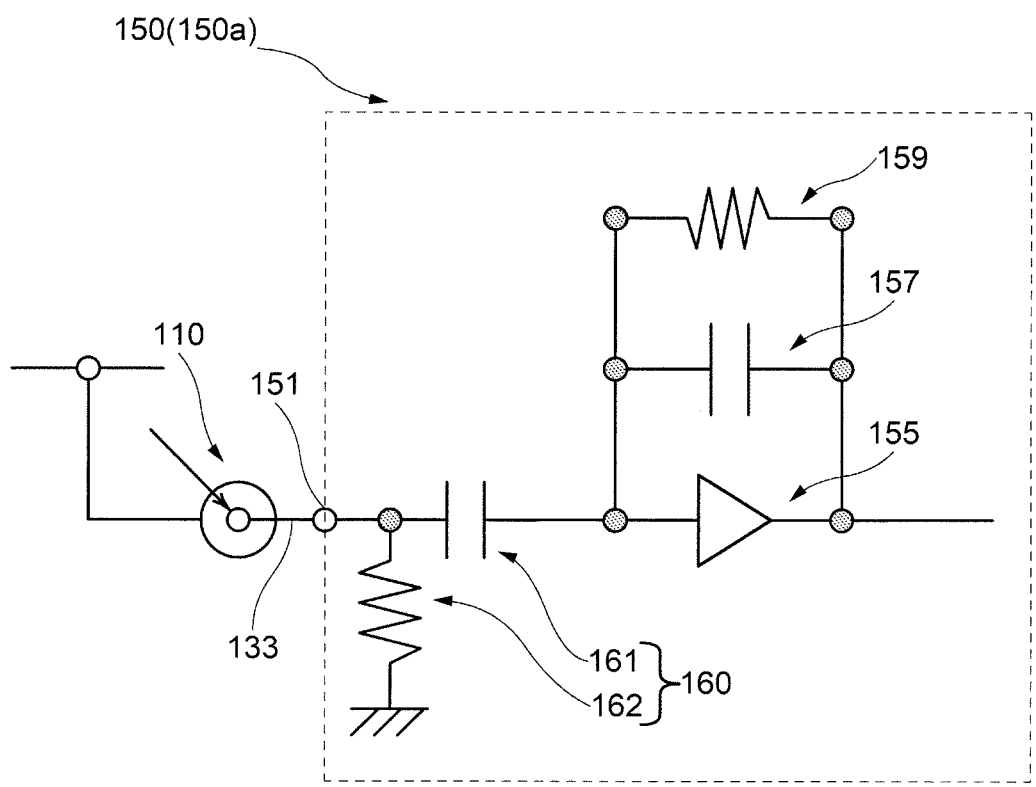
FIG. 9 is a part of a circuit diagram of the radiation detection device according to the first embodiment of the present disclosure.

Next, a circuit configuration of the radiation detection device 100 will be described with reference to the drawings, particularly focusing on an input section 150a of the circuit element 150. FIG. 9 is a circuit diagram of the radiation detection device 100.

In FIG. 9, the signal (electric charges) obtained in the detection element 110 is transmitted to the circuit element 150 via a wiring (the connection pad 133). The circuit element 150 has the input terminal 151, an AC coupling circuit 160, a preamplifier 155, a charge/voltage converter capacitor 157, and a resistor 159 in the input section 150a.

The input terminal 151 is connected to the detection element 110 at one end. Electric charges are transmitted from the detection element 110 toward the input terminal 151 as a signal, and the electric charges are input to the input section 150a.

The AC coupling circuit 160 is provided between the input terminal 151 and the preamplifier 155. The AC coupling circuit 160 includes a coupling capacitor 161 and a resistor 162. The AC coupling circuit 160 has a function of removing a direct current signal among the detection signals including the input direct current signal and the alternating current signal by the coupling capacitor 161 and outputting only the alternating current signal.

The preamplifier 155 is provided as a discrete-type circuit element. The preamplifier 155 has a function of amplifying the electric charge transmitted from the detection element 110. In the input section 150a, the preamplifier 155 is used together with the charge/voltage converter capacitor 157 and the resistor 159, and the amplified charge is output as a voltage signal (a pulse signal), for example, as a saw-shaped waveform.

An internal circuit configuration of the radiation detection device 100 will be exemplified as follows. These values can be appropriately changed depending on factors such as the captured state of the electric charges that become the pulse signal and the subsequent duration.

Capacitance value of the coupling capacitor 161: 1000 pF
Resistance value of the resistor 162: 1 MΩ
Capacitance value of the charge/voltage conversion condenser 157: 1 pF
Resistance of the resistor 159: 100 kΩ

In the radiation detection device 100, the anode electrode 101 is in a floating state, there is a case where the noise is overlapped on the detection signal. Further, between the anode electrode 101 and the cathode electrode, a leakage current due to foreign matter or the like may occur, and a short-circuit may occur by abnormal discharging.

However, in the present embodiment, by having the AC coupling circuit 160, the electric charge captured by the detection element 110 is not input to the internal circuit of the circuit element 150 as it is, and a fluctuation signal as the voltage signal (the pulse signal) is input. Therefore, the circuit element 150 is protected from being destroyed by a temporary overcurrent or the like. In addition, by using the present embodiment, unwanted noises are also removed from the detection signal. As a result, the signal-noise ratio (SN ratio) in a weak signal can be increased.

Second Embodiment

In the present embodiment, a radiation detection device in which the position of the external connection terminal is different from that of the first embodiment will be described. The description of the configuration described in the first embodiment will be incorporated.

Figure 10:
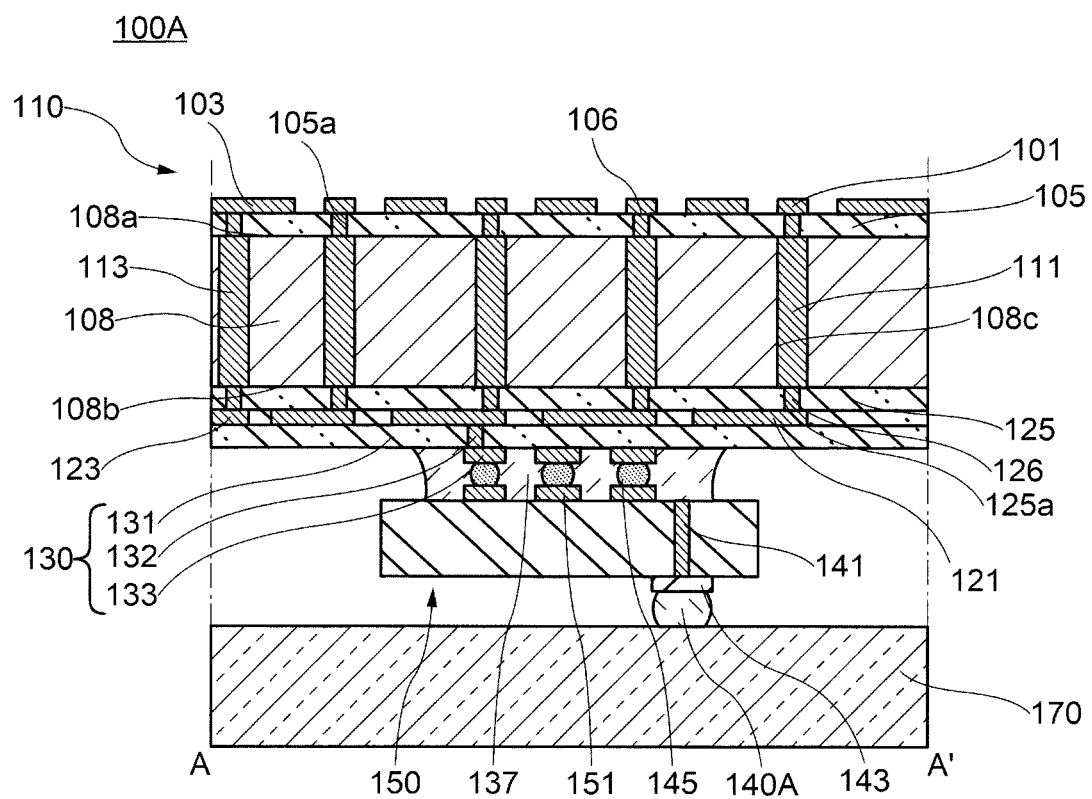
FIG. 10 is a cross-sectional view illustrating the radiation detection device according to a second embodiment of the present disclosure.

FIG. 10 is a cross-sectional view of a radiation detection device 100A. The radiation detection device 100A includes the detection element 110, the wiring layer 130 including the connection pad 133, an external connection terminal 140A, the circuit element 150, and the wiring board 170.

In the radiation detection device 100A, the external connection terminal 140A is arranged between the circuit element 150 and the opposing wiring board 170. The detection signal (electric charges) is transmitted from the detection element 110 to the circuit element 150, and the detection signal is arithmetically processed in the circuit element 150. Then, the arithmetically processed information is transmitted to the wiring board 170 via a through electrode 141, an electrode 143, and the external connection terminal 140A provided in the circuit element 150. In the above description, it can be said that the connection pad 133 and the external connection terminal 140A are indirectly connected.

A TSV (Through Silicon Via) is used as the through electrode 141. Although the diameter of the through electrode 141 is not particularly limited, the diameter of the through electrode 141 may be, for example, 20 µm.

The electrode 143 is formed of by UBM in which nickel (Ni) and gold (Au) are laminated. The UBM may include copper (Cu). A pillar electrode may be used between the electrode 143 and the through electrode 141.

When using the present embodiment, the signal can be further processed at high speed via the through electrode 141 and the electrode 143 provided in the circuit element 150 without passing through the wiring layer 130.

Third Embodiment

The present embodiment shows an example in which a plurality of circuit elements of the first embodiment is provided.

Figure 11:
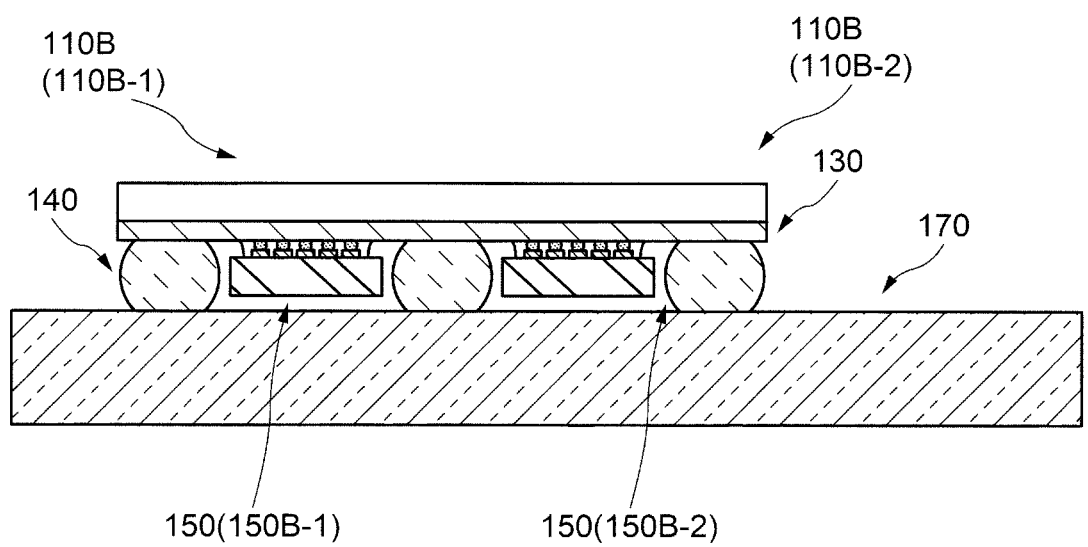
FIG. 11 is a cross-sectional view illustrating the radiation detection device according to a third embodiment of the present disclosure.

FIG. 11 is a cross-sectional view of a radiation detection device 100B. As shown in FIG. 11, the radiation detection device 100B includes the detection element 110, the wiring layer 130, the external connection terminal 140, and a circuit element 150B. In the radiation detection device 100B, the plurality of circuit elements 150B is provided and connected to the wiring board 170 via the external connection terminal 140. In this example, the same type of circuit element is used for an adjacent circuit element 150B-1 and a circuit element 150B-2 of the circuit element 150B. The required number of circuit elements 150B can be arranged according to the size of the detection element 110. It can be said that the size of the detection element 110 and the size of the circuit element 150B can be appropriately selected by using the present embodiment.

In the present embodiment, by providing a large number of same-type circuit elements, the detection region can be divided into blocks. By dividing into each block, the signal processing speed can be increased.

When the electric charges generated by the interaction between radiation and the gas and the electron avalanche are captured by the anode electrode 101, a potential fluctuation occurs locally in the detection element 110. In this case, in order to stabilize the potential of the anode electrode 101 in which the electron avalanche has occurred, power is supplied via the external connection terminal 140. However, the potential of the other anode electrode 101 without electron avalanche may be unstable (fluctuated). However, by using the present embodiment, since the detection region is divided into blocks, the influence of fluctuations can be suppressed. Therefore, potential stability in the detection element can be achieved.

In the present embodiment, although an example in which a plurality of same-type circuit elements is provided is described, the present invention is not limited thereto. Different types of circuit elements may be combined and used for a circuit element 150B. In this case, a circuit element for performing analog signal processing and a circuit element for performing digital signal processing may be used separately. A circuit element that further processes the signal processed arithmetically by the circuit element may be provided.

Fourth Embodiment

The present embodiment shows an example in which a plurality of detection elements and a plurality of circuit elements of the first embodiment are provided.

Figure 12:
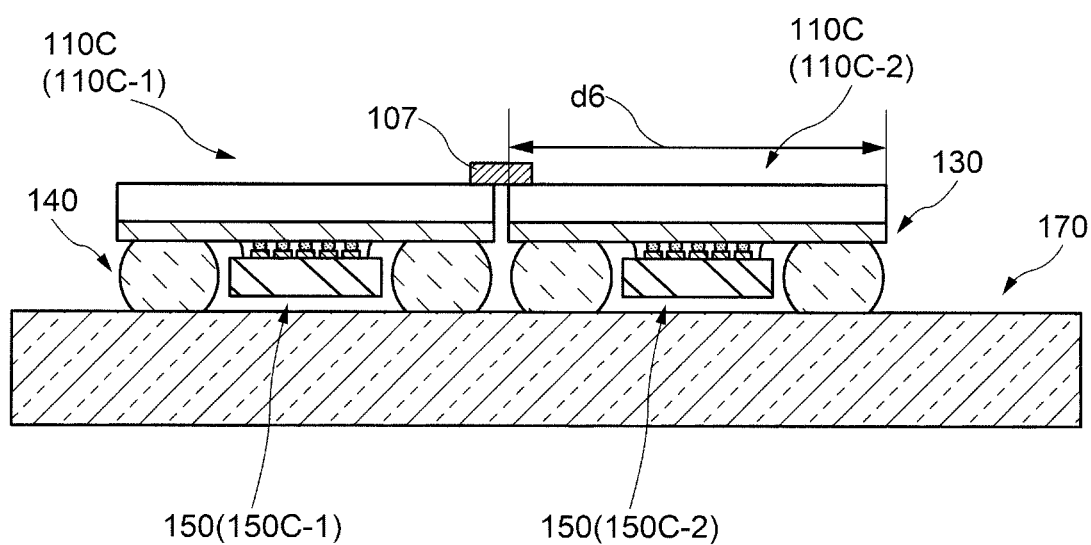
FIG. 12 is a cross-sectional view illustrating the radiation detection device according to a fourth embodiment of the present disclosure.
Figure 13:
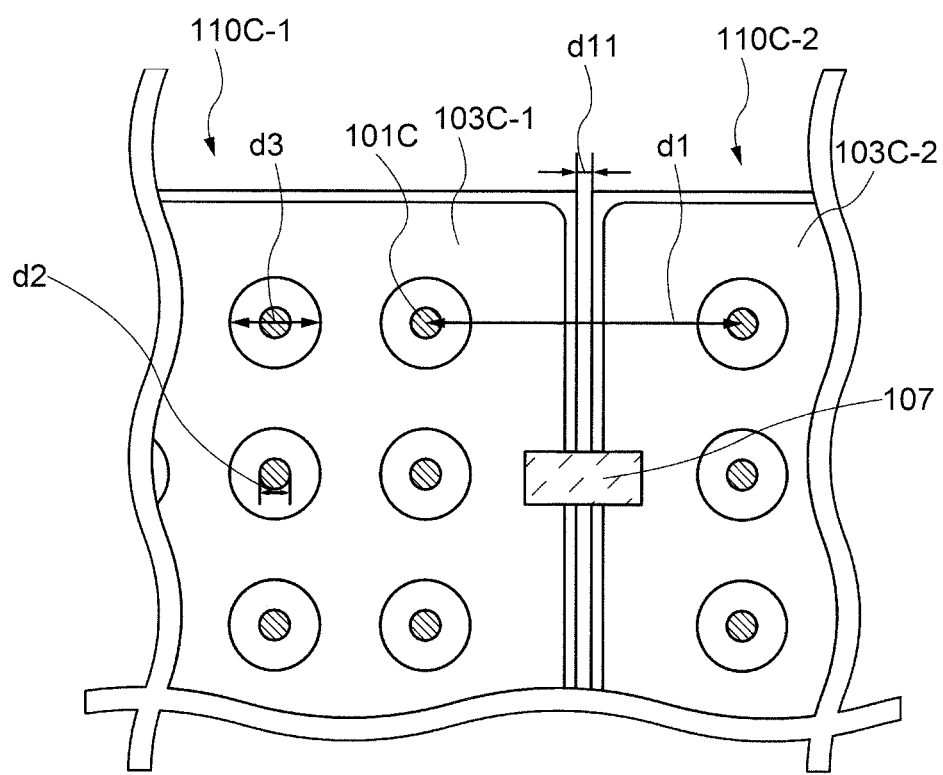
FIG. 13 is a portion of a top view in the radiation detection device according to the fourth embodiment of the present disclosure.

FIG. 12 is a cross-sectional view of a radiation detection device 100C. FIG. 13 is an enlarged view of a portion of a top view of the radiation detection device 100C. As shown in FIG. 12, the radiation detection device 100C includes a detection element 110C, the wiring layer 130, the external connection terminal 140, and the circuit element 150C. In the radiation detection device 100C, a plurality of detection elements 110C and a plurality of circuit elements 150C are provided apart from each other and connected to the wiring board 170. In this example, among the detection element 110C, a detection element 110C-1 is connected to a circuit element 150C-1, and a detection element 110C-2 is connected to a circuit element 150C-2.

The detection element 110C-1 and the detection element 110C-2 may be electrically connected by a connecting electrode 107 mounted over a cathode electrode 103C-1 and a cathode electrode 103C-2. In this example, a copper wiring is used for the connecting electrode 107. The connecting electrode 107 may be connected by a wire bonding, may be cured after applying conductive pastes, or may be connected by solder, and is not limited to the copper wiring. The connecting electrode 107 is not necessarily provided.

Dimensions of each component of the radiation detection device 100C will be exemplified as follows.

Distance d1 (1-pixel length) between centers of adjacent anode electrodes 101: 0.4 mm (The same applies to the adjacent detection element 110C-1 and the detection element 110C-2)

Diameter d2 of the anode electrode 101: 60 μm

Diameter d3 of the opening 103a: 250 μm

Length d6 of one side of the detection element 110C: 9.55 mm

Distance d11 between end portion of the adjacent detection element 110C-1 and end portion of the detection element 110C-2: 50 μm In the radiation detection device 100C, the distance between the adjacent anode electrodes 101C in the same detection element 110C-1 and the distance between the anode electrodes 101 provided on the outermost side of the adjacent detection elements 110C-1 is the same. Therefore, even if the radiation detection device 100C of the radiation detection device becomes large, it is the same as when one large detection device is used.

Therefore, since the plurality of detection elements and circuit elements can be combined by using the present embodiment, a desired sized radiation detection device can be easily configured, and a radiation detection device with a large area can be provided.

Fifth Embodiment

The present embodiment shows an example in which the size of the detection element and the circuit element is different from that of the first embodiment.

Figure 14:
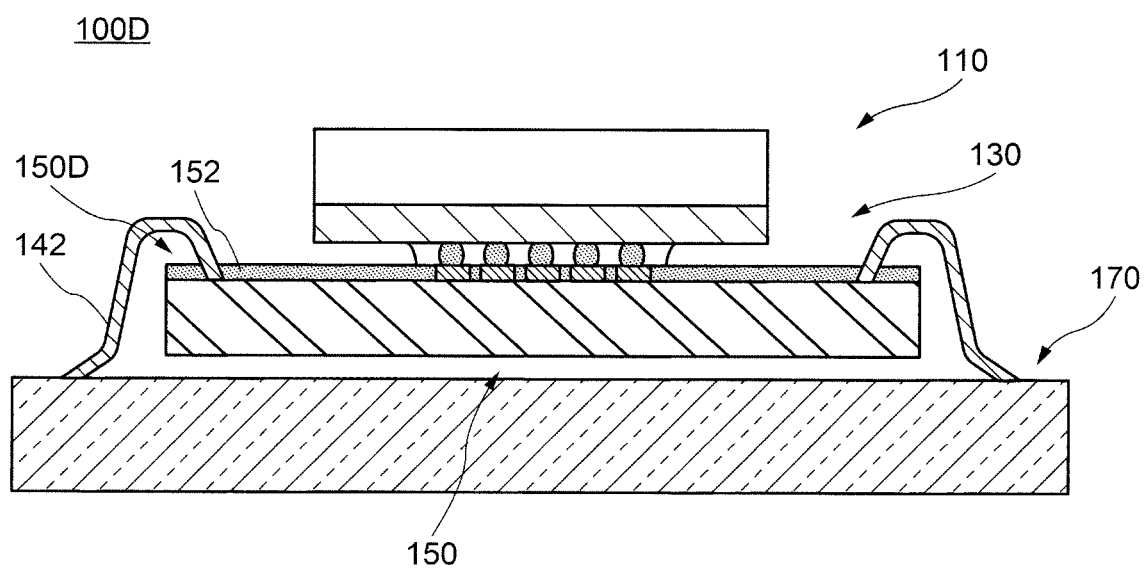
FIG. 14 is a cross-sectional view illustrating the radiation detection device according to a fifth embodiment of the present disclosure.

FIG. 14 is a cross-sectional view of a radiation detection device 100D. As shown in FIG. 14, the radiation detection device 100D includes the detection element 110, the wiring layer 130, a bonding wire 142, and a circuit element 150D.

In the radiation detection device 100D, the circuit element 150D may be arranged larger than the detection element 110. In this case, it is preferable that a radiation protection film 152 is provided on the detection element 110 side of the circuit element 150. In this example, the radiation protection film 152 is formed of a polyimide film. A thickness of the radiation protection film 152 may be appropriately adjusted. Thus, soft errors due to radiation in the circuit element 150D can be prevented. The bonding wire 142 may be used in place of the external connection terminal 140 used in other embodiments to connect the circuit element 150D and the wiring board 170. In this case, it is preferable to protect the bonding wire 142 by encapsulating the bonding wire 142 with an insulating resin or the like.

Sixth Embodiment

The present embodiment shows an example in which the location where the wiring board of the first embodiment is arranged is different.

Figure 15:
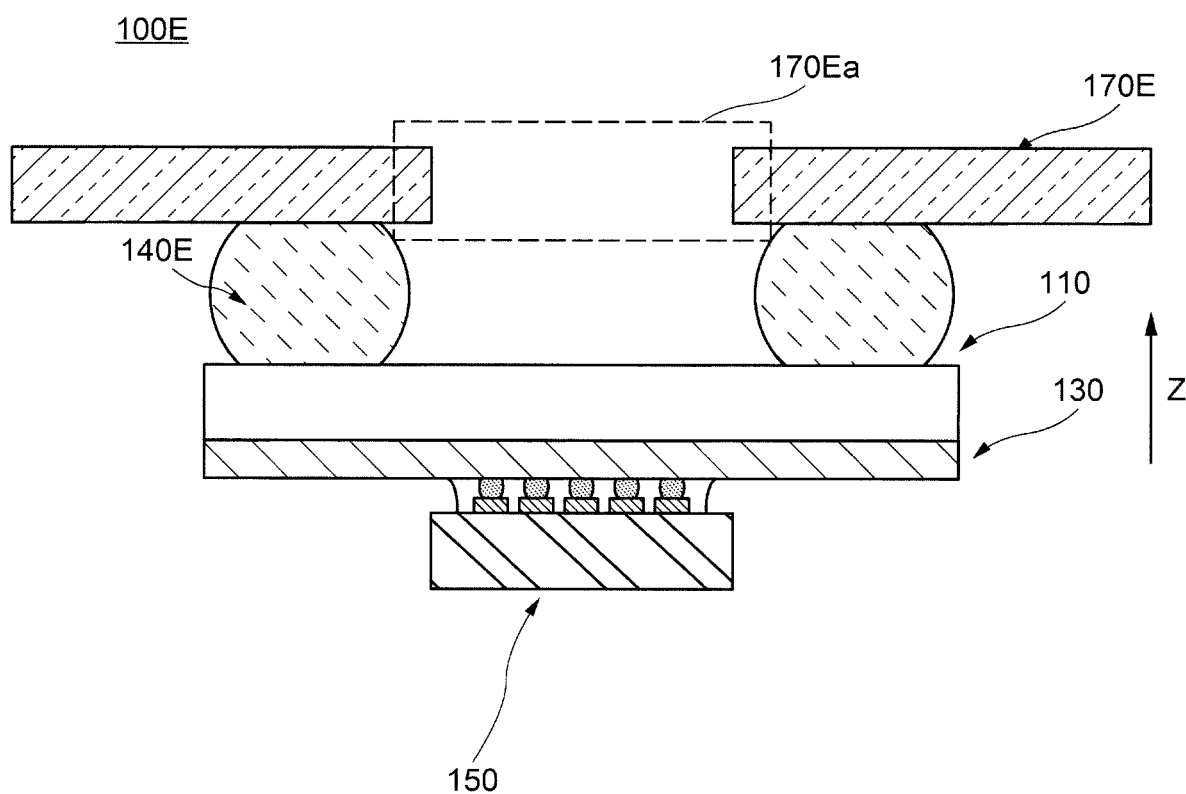
FIG. 15 is a cross-sectional view illustrating the radiation detection device according to a sixth embodiment of the present disclosure.

FIG. 15 is a cross-sectional view of a radiation detection device 100E. As shown in FIG. 15, the radiation detection device 100E includes the detection element 110, the wiring layer 130, an external connection terminal 140E, the circuit element 150, and a wiring board 170E.

In the radiation detection device 100E, the external connection terminal 140E and the wiring board 170E may be arranged on the detection side of the detection element 110. The wiring board determines the position of the detection element 110 in the chamber. On the other hand, the position in the Z direction of the anode electrode must be set accurately to measure the position in the Z direction where the interaction with the gas occurred at the time when the anode electrode captured the electrons. Although a thickness variation of the base material and the wiring layer 130 in the detection element 110 may occur during manufacturing or between manufacturing lots, the position of the anode electrode in the Z direction can be stabilized by arranging the wiring board on the detection side where the anode electrode of the detection element 110 has been formed. Therefore, it is possible to improve the measurement accuracy in the Z direction. In this case, it is preferable that the wiring board 170E has an opening 170Ea. A region on which the anode electrode and the cathode electrode of the detection element 110 are formed is preferably arranged to match the opening 170Ea. The detection element 110 needs a region for arranging the external connection terminal 140E in addition to a region in which the anode electrode and the cathode electrode are arranged. On the other hand, since the surface where the anode electrode and the cathode electrode of the detection element 110 are arranged becomes a reference plane of the electric field to be generated between the drift electrodes, the radiation detection device can be miniaturized in the electric field direction by the thickness of the wiring board and external connection terminal as compared with the first embodiment.

Seventh Embodiment

The present embodiment shows an example in which the configuration of the wiring board is different.

Figure 16:
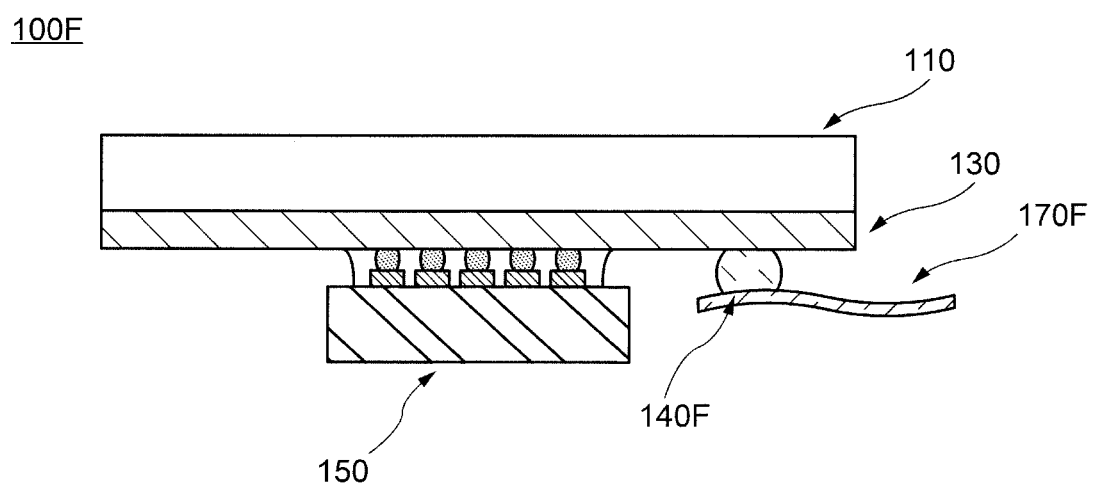
FIG. 16 is a cross-sectional view illustrating the radiation detection device according to a seventh embodiment of the present disclosure.

FIG. 16 is a cross-sectional view of a radiation detection device 100F. As shown in FIG. 16, the radiation detection device 100F includes the detection element 110, the wiring layer 130, an external connection terminal 140F, the circuit element 150, and a wiring board 170F.

In the radiation detection device 100F, a flexible printed substrate (FPC) having flexibility is used for the wiring board 170F. The ACF may be used for the external connection terminal 140F. Since the wiring board 170F has flexibility, signals can be extracted to the outside of the chamber regardless of the arrangement position of the radiation detection device 100F. In the case of a rigid wiring board, a signal extraction portion to the outside of the chamber is limited, or it was necessary to connect an additional connector terminal and a cable to the rigid wiring board. Therefore, by using the wiring board 170F having flexibility, the number of connecting points can be reduced and the reliability can be improved. Furthermore, in the radiation detection device 100F, the chamber can be configured with the size of the detection element 110. Therefore, the radiation detection device 100F can be miniaturized, and members constituting the drift electrode 80 or the chambers can be miniaturized, so that the production costs can be reduced. The signal from the detection element 110 is integrated by the circuit element and transmitted to the wiring board 170F as a high-speed serial signal. Therefore, it is preferable that the wiring board 170F has a transmission line having an electrically shielded layer.

Eighth Embodiment

In the present embodiment, a radiation detection device in which a part of a circuit configuration is different from that of the first embodiment will be described.

Figure 17:
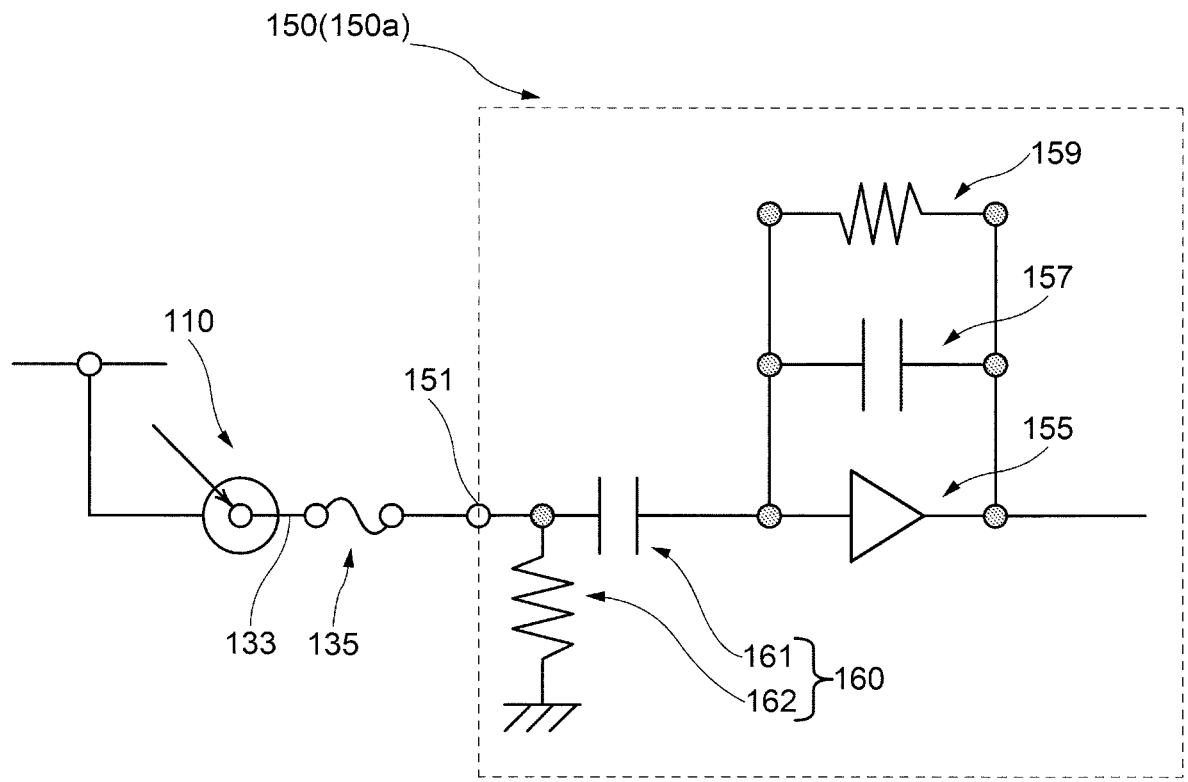
FIG. 17 is a part of a circuit diagram of the radiation detection device according to an eighth embodiment of the present disclosure.

FIG. 17 is a circuit diagram of a radiation detection device 100G. In FIG. 17, the radiation detection device 100G includes a protection circuit (a fuse element 135 in this example), together with the detection element 110, the connection pad 133, the AC coupling circuit 160, the preamplifier 155, the charge/voltage conversion condenser 157, and the circuit element 150 including the resistor 159.

The fuse element 135 is provided in the wiring layer 130, and the fuse element 135 is arranged between the connection pad 133 and the input terminal 151. Specifically, the fuse element 135 is provided between each of the connection pad 133 (the first wiring, the second wiring, the third wiring, and the fourth wiring described in the first embodiment), and the input terminal 151 of the circuit element 150 corresponding thereto. Among metals, a low-melting-point material is used for the fuse element 135. In this example, indium is used for the fuse element 135. In addition to the indium single material, an alloy material such as a low melting point solder (tin-indium alloy), or a copper wiring may be used for the fuse element 135. The fuse element 135 may be provided in the circuit element 150. In this case, the fuse element 135 is preferably arranged between the input terminal 151 and the AC coupling circuitry 160.

When the copper wiring is used for the fuse element 135, the line width of the wiring may be partially reduced, or the thickness of the wiring may be reduced.

A MEMS (Micro Electro Mechanical Systems) switch may be used for the fuse element 135. By using the MEMS switch, it is possible to detect an unnecessary voltage and provide feedback to the circuit element 150.

By using the present embodiment, when an overcurrent flows in the anode electrode 101, the fuse element 135 melts and is cut by heat generation. Thus, when the overcurrent flows, the conductive material built in one fuse element 135 melts and is cut by Joule heat, and an open circuit is formed. As a result, the circuit (e.g., the circuit element 150) is protected.

The fuse element 135 is provided for each of the pixel electrodes (the anode electrode 101 and the cathode electrode 103). As a result, in the case where the detection cannot be performed by one pixel electrode, the other pixel electrodes are separated and exist independently. Thus, the other pixel electrodes are not affected. Therefore, it is possible to maintain a high position resolution.

In the present embodiment, although an example of providing the fuse element 135 as the protection circuit is shown, the embodiment is not limited thereto. For example, as the protection circuit, a switch that can open and disconnect the circuit, or varistor, or an element that self-heals due to a potential difference even once open and disconnected may be used. Additionally, a protection diode may be used if the protection circuit is arranged in the circuit element 150.

The fuse element 135 may include a bimetal. The bimetal is made by laminating two metal plates with different coefficients of thermal expansion. The bimetal is curved with high accuracy with temperature change. When the bimetal is used, even if it is temporarily curved due to heat generated by an overcurrent, if the temperature of the metal plates returns to its original temperature, the position of the bimetal can also be returned to the original position. Thus, a reversible fuse circuit can be formed.

Specific Configuration Example

Hereinafter, a specific configuration example of the radiation detection device 100 will be described.

Figure 18:
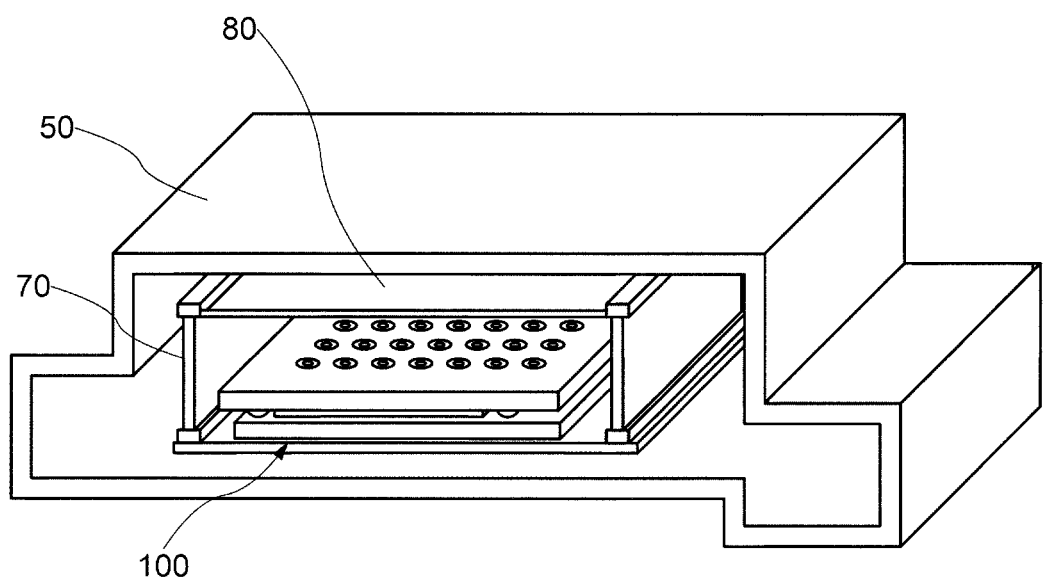
FIG. 18 is a diagram illustrating a specific configuration example of the radiation detection device according to each embodiment of the present disclosure.

FIG. 18 is a perspective view of the radiation detection device 10. As shown in FIG. 18, the radiation detection device 10 (also referred to as a container module) includes the chamber 50 as described above. Inside the chamber 50, the detection element 110 (in the case of the first embodiment), a drift cage 70, and the drift electrode 80 are arranged. The detection element 110 and the drift electrode 80 are arranged to face each other. When detecting radiation, a mixed gas of a rare gas and a quenching gas as described above is filled in the chamber 50.

Figure 19:
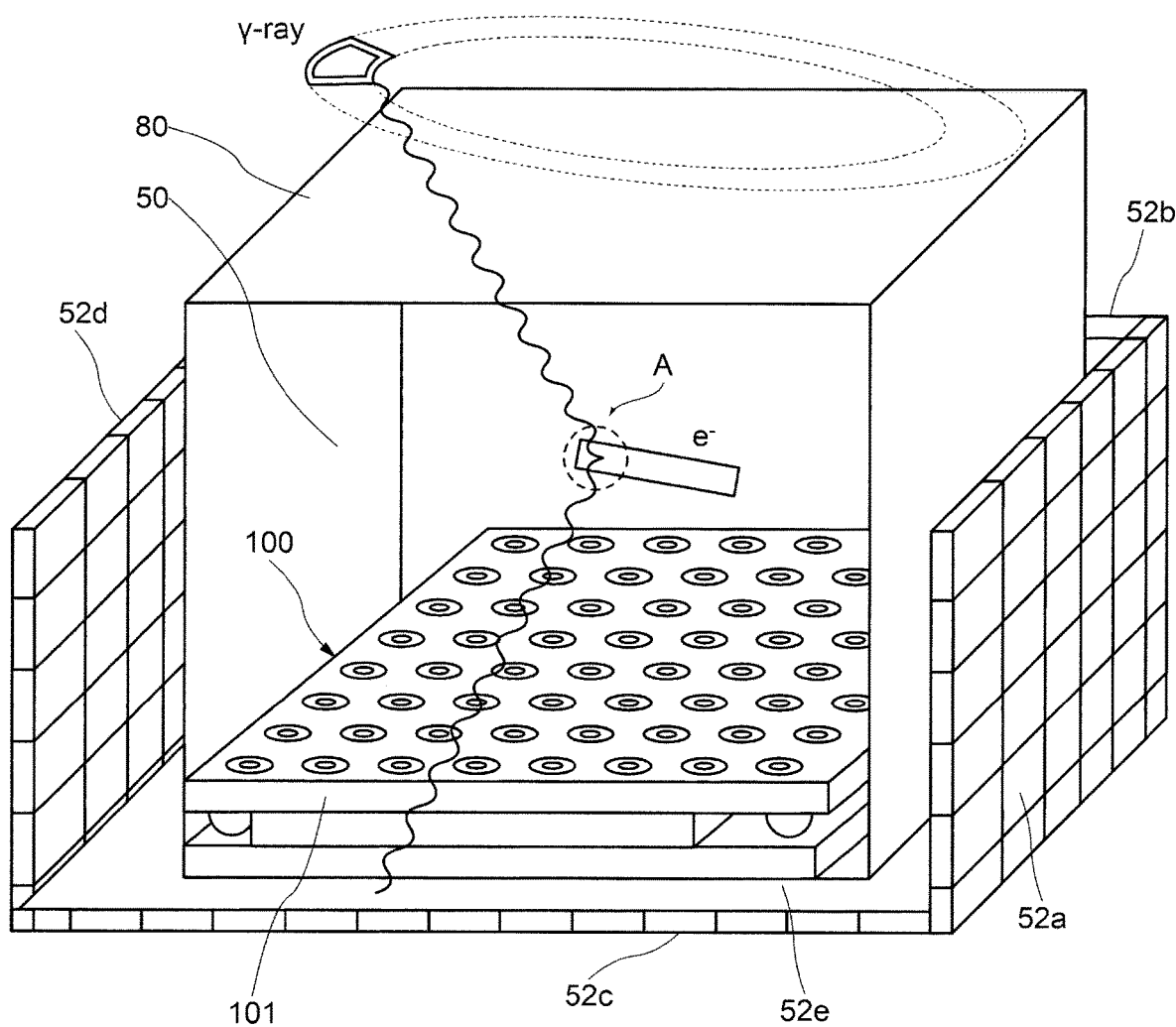
FIG. 19 is a diagram illustrating a specific configuration example of the radiation detection device according to each embodiment of the present disclosure.

FIG. 19 is a schematic configuration diagram of a compton camera 20 using the radiation detection device 10. As shown in FIG. 19, a detection module 52 is provided so as to surround the radiation detection device 100 from five directions. In FIG. 19, the five modules are denoted by reference numerals 52a to 52e, respectively. Although an example of providing the detection module 52 in five directions is shown, the detection module 52 may be provided in at least one direction (e.g., a downward direction of the anode electrode 101).

A principle of the compton camera 20 is as follows. First, when a γ-ray is incident on the radiation detection device 100 from the outside, the incident γ-rays collide with the gas in the chamber 50 at a certain probability, and the γ-rays is scattered. A symbol "A" shown in FIG. 19 is a collision position. The scattered γ-rays in which a traveling direction has changed by the collision pass through the radiation detection device 100 and are incident on the detection module 52. A light emission occurs when the scattered γ-rays are incident on the detection module 52, and the light emission is converted into an electric signal by a photomultiplier tube or the like. The electrical signal obtained in this way is acquired as information indicating the incident position of the scattered γ-rays and the time of the scattered γ-rays. At this time, an energy of the scattered γ-rays may be acquired. When acquiring the energy of the scattered γ-rays, by configuring so as to perform detection while limiting to the energy range that is assumed when the γ-rays from a predetermined radiation source are scattered only once in the chamber, it is possible to remove the influence (noise) due to the multiplied scattered γ-rays.

On the other hand, the gas in the chamber 50 which collided with the incident γ-ray emits a recoil electron e⁻ (charged particle) in a predetermined direction from the position of the symbol A. Then, an electron cloud is generated along a track of the recoil electron. The electrons constituting the electron cloud are attracted to the pixel electrode (the anode electrode 101) by the electric field between the drift electrode 80 and the pixel electrode (the anode electrode 101). At this time, the electrons attracted to the vicinity of the pixel electrode (the anode electrode 101) collide with the gas and ionizes the gas. Furthermore, the electrons generated by ionization proliferate in an avalanche and are detected by the pixel electrode (the anode electrode 101). The electric signal obtained in this way corresponds to the detection signal, and the detection signal is a signal capable of identifying the position of the pixel at which the electron is detected and the time at which the electron is detected in the pixel.

According to the time from when the scattered γ-rays enter the detection module 52 to when electrons are detected at the pixel electrode (the anode electrode 101), a distance (a position in the z-direction) from the pixel electrode (the anode electrode 101) to the position where the electron cloud occurred can be calculated.

(Modification 1)

In the first embodiment of the present disclosure, although an example in which a distance between the anode electrodes 101 adjacent in the X direction and a distance between the anode electrodes 101 adjacent in the Y direction are equal, and the X direction and the Y direction intersect at 90 degrees has been shown, the embodiment is not limited thereto. The distance between the adjacent anode electrodes 101 may be different in the X direction and the Y direction.

That is, the matrix is not limited to a square arrangement and may not be a close-packed arrangement.

(Modification 2)

The anode electrode 101 and the cathode electrode 103 are not limited to copper, and a material such as nickel, gold, and tin may be used for the anode electrode 101 and the cathode electrode 103. The anode electrode 101 and the cathode electrode are not limited to a single material, and an alloy or a multilayer film, or a conductive paste, or the like may be used for the anode electrode 101 and the cathode electrode 103.

(Modification 3) Other conductive materials may be used for the via electrode 132 and the connection pad 133. For example, a single material such as aluminum, tungsten, molybdenum, or titanium may be used, or a stacked film of titanium and copper may be used. For example, tungsten or molybdenum is a heavy element and is preferable because tungsten or molybdenum has a high radiation shielding ability with respect to radiation that has passed through the detection element 110.

(Modification 4)

A material that absorbs radiation (a heavy metal material such as tungsten or molybdenum) or a material (e.g., cesium iodide (CsI) or barium fluoride (BaF2)) that causes scintillation light emission by radiation may be used as the wiring material of the wiring board 170. The material to be used may be appropriately selected depending on the energy and type of radiation. When using a material that causes scintillation light emission, it is possible to measure radiation transmitted through the detection element 110 by arranging an image sensor element on the wiring board 170.

(Modification 5)

In the first embodiment of the present disclosure, although an example in which the AC coupling circuit 160 is provided in the circuit element 150 is shown, the present invention is not limited thereto. For example, the AC coupling circuit 160 may be provided on the wiring layer 130.

(Modification 6)

In the first embodiment of the present disclosure, although the connection pad 133 is shown as one layer, it may be provided over a plurality of layers.

(Modification 7)

In the first embodiment of the present disclosure, although an example in which the glass substrate is used as the insulating substrate 108 is shown, materials such as a resin material (e.g., polyimide), a liquid crystal polymer, or silicon may be used. It is preferable to ensure that a leak current through the substrate is prevented by performing an insulating treatment on the surface when a silicone substrate is used. The insulating substrate 108 may be formed by laminating a plurality of types of the insulating layers.

(Modification 8)

A semiconductor element such as a switching element and a protective element may be configured in the detection element 110. For example, a semiconductor element may be formed in a region in which the anode electrode and the cathode electrode of the detection element are arranged using an SOI (Silicon on Insulator) substrate.

In the first embodiment of the present disclosure, electrodes or wirings (also referred to as dummy electrodes or dummy wirings) which are not involved in the detection may be appropriately arranged in the vicinity of the anode electrode 101. With these dummy electrodes or dummy wirings, it is possible to particularly stabilize the electric field (an electromagnetic force line) with the drift electrode on an outer peripheral edge surface of the detection element 110. Therefore, it is possible to suppress the detection of electrons generated in the outer peripheral portion of the detection element 110, which is unnecessary in the detection position, by the anode electrode 101. On the other hand, by arranging the dummy electrode or dummy wiring, variations in etching and plating or the like in the manufacturing process can be suppressed. As a result, the shape of the anode electrode and the cathode electrode can be stabilized.

What is claimed is:

1. A radiation detection device comprising:
   a detection element including:
      a substrate having a first surface and a second surface on an opposite side with respect to the first surface;
      a first electrode arranged on the first surface;
      a second electrode adjacent to the first electrode in a first direction;
      a third electrode adjacent to the first electrode in a second direction intersecting the first direction;
      a fourth electrode adjacent to the third electrode in the first direction and adjacent to the second electrode in the second direction; and
      a fifth electrode arranged on the first surface of the substrate and arranged between the first electrode and the second electrode, between the first electrode and the third electrode, between the second electrode and the fourth electrode, and between the third electrode and the fourth electrode, the fifth electrode integrally surrounding the first electrode, the second electrode, the third electrode, and the fourth electrode;
   a wiring layer arranged on the second surface side and including a first wiring connected to the first electrode, a second wiring connected to the second electrode, a third wiring connected to the third electrode, and a fourth wiring connected to the fourth electrode; and
   a circuit element arranged opposite to the wiring layer in a normal direction of the substrate and connected to the first wiring, the second wiring, the third wiring, and the fourth wiring, wherein
   the first wiring, the second wiring, the third wiring, and the fourth wiring are insulated from each other.

2. The radiation detection device according to claim 1, wherein
   the first electrode, the second electrode, the third electrode, and the fourth electrode have a portion penetrating from the first surface to the second surface.

3. The radiation detection device according to claim 2, wherein
   the fifth electrode includes a first opening around the first electrode, a second opening around the second electrode, a third opening around the third electrode, and a fourth opening around the fourth electrode.

4. The radiation detection device according to claim 3, wherein
   the first opening, the second opening, the third opening and the fourth opening have a circular shape.

5. The radiation detection device according to claim 1 further comprising:
   a second detection element arranged apart from the detection element.

6. The radiation detection device according to claim 5, wherein
   the fifth electrode of the detection element and the second detection element are electrically connected by a mounted electrode.

7. The radiation detection device according to claim 1, wherein
   the fifth electrode has a portion penetrating from the first surface to the second surface.

8. The radiation detection device according to claim 1 further comprising:
   an external connection terminal arranged on the wiring layer; and
   a wiring board connected to the external connection terminal.

9. The radiation detection device according to claim 8, wherein
   a thickness of the external connection terminal is greater a thickness of the circuit element.

10. The radiation detection device according to claim 9, wherein
    the external connection terminal is arranged outside of the circuit element.

11. The radiation detection device according to claim 10 further comprising:
    a second external connection terminal arranged on the circuit element and having a portion connected to the wiring layer.

12. A radiation detection device comprising:
    a detection element including:
       a substrate having a first surface and a second surface on an opposite side with respect to the first surface;
       a first electrode arranged on the first surface;
       a second electrode adjacent to the first electrode in a first direction;
       a third electrode adjacent to the first electrode in a second direction intersecting the first direction;
       a fourth electrode adjacent to the third electrode in the first direction and adjacent to the second electrode in the second direction; and
       a fifth electrode arranged on the first surface of the substrate and arranged between the first electrode and the second electrode, between the first electrode and the third electrode, between the second electrode and the fourth electrode, and between the third electrode and the fourth electrode;
    a wiring layer arranged on the second surface side and including a first wiring connected to the first electrode, a second wiring connected to the second electrode, a third wiring connected to the third electrode, and a fourth wiring connected to the fourth electrode; and
    a circuit element arranged opposite to the wiring layer in a normal direction of the substrate and connected to the first wiring, the second wiring, the third wiring, and the fourth wiring, wherein
    the fifth electrode has a portion penetrating from the first surface to the second surface and connected to the external connection terminal via a fifth wiring being provided in the wiring layer.

13. A radiation detection device comprising:
    a detection element including:
       a substrate having a first surface and a second surface on an opposite side with respect to the first surface;
       a first electrode arranged on the first surface;
       a second electrode adjacent to the first electrode in a first direction;
       a third electrode adjacent to the first electrode in a second direction intersecting the first direction;
       a fourth electrode adjacent to the third electrode in the first direction and adjacent to the second electrode in the second direction; and
       a fifth electrode arranged on the first surface of the substrate and arranged between the first electrode and the second electrode, between the first electrode and the third electrode, between the second electrode and the fourth electrode, and between the third electrode and the fourth electrode;
a wiring layer arranged on the second surface side and including a first wiring connected to the first electrode, a second wiring connected to the second electrode, a third wiring connected to the third electrode, and a fourth wiring connected to the fourth electrode; and
a circuit element arranged opposite to the wiring layer in a normal direction of the substrate and connected to the first wiring, the second wiring, the third wiring, and the fourth wiring;
a wiring board arranged opposite to the circuit element; and
an external connection terminal arranged between the circuit element and the wiring board.

14. A radiation detection device comprising:
a detection element including two or more electrodes detecting an electric charge generated by an interaction between radiation and a material, the two or more electrodes being arranged separately on the same plane in a first direction and in a second direction intersecting the first direction;
a wiring layer having wiring individually connected to each of the two or more electrodes, and
a connection pad arranged in the same plane on the wiring layer and being individually connected to the wiring; and
a circuit element arranged opposite to the connection pad and being connected to the connection pad, the circuit element including:
an input section having an input terminal;
a pre-amplifier; and
an AC coupling circuit arranged between the input terminal and the pre-amplifier.

15. The radiation detection device according to claim 14, wherein the material is a gas.

16. The radiation detection device according to claim 14 further comprising:
an external connection terminal arranged on the wiring layer; and
a wiring board connected to the external connection terminal.

17. The radiation detection device as claimed in claim 16, wherein
a thickness of the external connection terminal is greater than a thickness of the circuit element.

18. A radiation detection device comprising:
a detection element including:
a substrate having a first surface and a second surface on an opposite side with respect to the first surface;
a first electrode arranged on the first surface;
a second electrode adjacent to the first electrode in a first direction;
a third electrode adjacent to the first electrode in a second direction intersecting the first direction;
a fourth electrode adjacent to the third electrode in the first direction and adjacent to the second electrode in the second direction; and
a fifth electrode arranged on the first surface of the substrate and arranged between the first electrode and the second electrode, between the first electrode and the third electrode, between the second electrode and the fourth electrode, and between the third electrode and the fourth electrode;
a wiring layer arranged on the second surface side and including a first wiring connected to the first electrode, a second wiring connected to the second electrode, a third wiring connected to the third electrode, and a fourth wiring connected to the fourth electrode; and
a circuit element arranged opposite to the wiring layer in a normal direction of the substrate and connected to the first wiring, the second wiring, the third wiring, and the fourth wiring, the circuit element including:
an input section having an input terminal,
a pre-amplifier; and
an AC coupling circuit arranged between the input terminal and the pre-amplifier.

19. The radiation detection device according to claim 18 further comprising:
a protection circuit between the circuit element and the wiring layer.

20. The radiation detection device according to claim 19, wherein
the protection circuit is a fuse element.

* * * * *